(12) United States Patent
Guan et al.

(10) Patent No.: US 10,313,081 B2
(45) Date of Patent: Jun. 4, 2019

(54) METHOD, APPARATUS, AND DEVICE FOR TRANSMITTING ACKNOWLEDGEMENT INFORMATION

(71) Applicant: Huawei Technologies Co., Ltd., Shenzhen (CN)

(72) Inventors: Lei Guan, Beijing (CN); Lixia Xue, Beijing (CN); Yan Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 88 days.

(21) Appl. No.: 15/462,291

(22) Filed: Mar. 17, 2017

(65) Prior Publication Data

US 2017/0195103 A1 Jul. 6, 2017

Related U.S. Application Data

(63) Continuation of application No. PCT/CN2014/086854, filed on Sep. 18, 2014.

(51) Int. Cl.
*H04L 5/00* (2006.01)
*H04L 1/18* (2006.01)
*H04L 5/14* (2006.01)

(52) U.S. Cl.
CPC .......... *H04L 5/0055* (2013.01); *H04L 1/1812* (2013.01); *H04L 1/1854* (2013.01); *H04L 5/14* (2013.01)

(58) Field of Classification Search
CPC ........ H04L 1/1812; H04L 5/0055; H04L 5/14
See application file for complete search history.

(56) References Cited

U.S. PATENT DOCUMENTS 9,320,038 B2 4/2016 Choi et al.
9,456,443 B2 9/2016 Li et al.
(Continued)

FOREIGN PATENT DOCUMENTS

CN 102651680 A 8/2012
CN 103209061 A 7/2013
(Continued)

OTHER PUBLICATIONS

"3rd Generation Partnership Project; Technical Specification Group Radio Access Network; Evolved Universal Terrestrial Radio Access (E-UTRA); Physical layer procedures (Release 12)," 3GPP TS 36.213, V12.2.0, pp. 1-207, 3$^{rd}$ Generation Partnership Project, Valbonne, France (Jun. 2014).
(Continued)

*Primary Examiner* — Andrew Lai
*Assistant Examiner* — M Mostazir Rahman
(74) *Attorney, Agent, or Firm* — Leydig, Voit & Mayer, Ltd.

(57) ABSTRACT

Disclosed is a method and an apparatus for transmitting acknowledgement information. The apparatus includes: a transmission module, configured to transmit, in a secondary serving cell, a PDSCH to a UE; a determining module, configured to determine an HARQ time sequence relationship corresponding to the secondary serving cell, where the HARQ time sequence relationship is an HARQ time sequence relationship between the PDSCH and an HARQ; and a receiving module, configured to receive, in a primary serving cell according to the HARQ time sequence relationship determined by the determining module, the HARQ-ACK corresponding to the PDSCH. The primary serving cell is a TDD primary serving cell configured by a base station for the UE, the secondary serving cell is a secondary serving cell in N TDD secondary serving cells configured by the
(Continued)

base station for the UE, and N is a natural number that is greater than or equal to 1.

17 Claims, 3 Drawing Sheets

(56) References Cited

U.S. PATENT DOCUMENTS

| | | | |
|---|---|---|---|
| 2013/0308550 A1* | 11/2013 | Yin | H04L 5/001 370/329 |
| 2014/0133420 A1 | 5/2014 | Oizumi et al. | |
| 2014/0192688 A1 | 7/2014 | Yang et al. | |
| 2015/0103705 A1 | 4/2015 | Yang et al. | |
| 2017/0208582 A1* | 7/2017 | Liang | H04W 24/00 |

FOREIGN PATENT DOCUMENTS

| | | | |
|---|---|---|---|
| CN | 103384189 A | | 11/2013 |
| CN | 103493417 A | | 1/2014 |
| CN | 105323849 A | * | 6/2014 |
| EP | 2704482 A1 | | 3/2014 |
| EP | 2814195 A1 | | 12/2014 |
| JP | 2014529966 A | | 11/2014 |
| JP | 2016502822 A | | 1/2016 |
| JP | 2016511601 A | | 4/2016 |
| WO | 2013021569 A1 | | 2/2013 |
| WO | 2013043025 A2 | | 3/2013 |
| WO | 2013119090 A1 | | 8/2013 |
| WO | 2014089107 A1 | | 6/2014 |
| WO | 2014133321 A1 | | 9/2014 |

OTHER PUBLICATIONS

"3rd Generation Partnership Project; Technical Specification Group Radio Access Network; Evolved Universal Terrestrial Radio Access (E-UTRA); User Equipment (UE) radio access capabilities (Release 12)," 3GPP TS 36.306, V12.1.0, pp. 1-30, $3^{rd}$ Generation Partnership Project, Valbonne, France (Jun. 2014).

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.2.0, pp. 1-365, $3^{rd}$ Generation Partnership Project, Valbonne, France (Jun. 2014).

R1-143322, Ericsson, "Correction to DL HARQ feedback table for TDD," 3GPP TSG RAN WG1 Meeting #78, Dresden, Germany, Aug. 18-22, 2014,total 2 pages.

* cited by examiner

METHOD, APPARATUS, AND DEVICE FOR TRANSMITTING ACKNOWLEDGEMENT INFORMATION

CROSS-REFERENCE TO RELATED APPLICATIONS

This application is a continuation of International Application No. PCT/CN2014/086854, filed on Sep. 18, 2014, the disclosure of which is hereby incorporated by reference in its entirety.

TECHNICAL FIELD

Embodiments of the present disclosure relate to communications technologies, and in particular, to a method, an apparatus, and a device for transmitting acknowledgement information.

BACKGROUND

A carrier aggregation (CA) technology is supported by a time division duplex (TDD) standard in a Long Term Evolution (LTE) system, namely, an LTE TDD system. Multiple component carriers or serving cells may be simultaneously allocated to one user equipment (UE) to support transmission at a high data rate.

In the prior art, a maximum of five carriers or serving cells may be configured for one UE. However, if a configuration of a carrier or serving cell is an uplink-downlink configuration 5, transmission of acknowledgement information is limited. For example, for a transmission mode of a physical uplink control channel (PUCCH) format 3, a maximum quantity of bits in acknowledgement information supported by this transmission mode is 20. In the prior art, in a carrier aggregation scenario, when there is one carrier in some TDD uplink-downlink configurations or the carrier is in some reference uplink-downlink configurations, a maximum of two carriers can be configured for the UE. In addition, in some TDD reference configurations, acknowledgement information corresponding to all downlink subframes of a secondary serving cell is fed back in one or several uplink subframes. As a result, a feedback delay is increased, and feedback performance is degraded.

SUMMARY

Embodiments of the present disclosure provide a method, an apparatus, and a device for transmitting acknowledgement information, so as to configure more carriers for UE in some uplink-downlink configurations of an LTE TDD system, shorten an acknowledgement information feedback delay, and improve feedback performance.

According to a first aspect, an embodiment of the present disclosure provides an apparatus for transmitting acknowledgement information, applied to a time division duplex TDD system, where the apparatus includes:

a determining module, configured to determine to transmit, in a secondary serving cell, a physical downlink shared channel PDSCH to user equipment UE;

a transmission module, configured to transmit, in the secondary serving cell, the PDSCH determined by the determining module to the UE; where the determining module is further configured to determine a hybrid automatic repeat request HARQ time sequence relationship corresponding to the secondary serving cell, where the HARQ time sequence relationship is an HARQ time sequence relationship between the PDSCH and HARQ acknowledgement HARQ-ACK information; and a receiving module, configured to receive, in a primary serving cell according to the HARQ time sequence relationship determined by the determining module, an HARQ-ACK corresponding to the PDSCH; where the primary serving cell is a TDD primary serving cell configured by a base station for the UE, the secondary serving cell is a secondary serving cell in N TDD secondary serving cells configured by the base station for the UE, and N is a natural number that is greater than or equal to 1.

In a first possible implementation manner of the first aspect, the HARQ time sequence relationship includes:

an uplink-downlink configuration of the primary serving cell is any one of an uplink-downlink configuration 0, an uplink-downlink configuration 1, an uplink-downlink configuration 2, or an uplink-downlink configuration 6, where when the uplink-downlink configuration of the primary serving cell is the uplink-downlink configuration 0, uplink subframes of the primary serving cell include a subframe 2, a subframe 3, a subframe 4, a subframe 7, a subframe 8, and a subframe 9, where an HARQ-ACK of a subframe of the secondary serving cell corresponding to a subframe that is forward offset by five subframes and/or forward offset by six subframes from the corresponding subframe 2 is fed back in the subframe 2 of the primary serving cell, an HARQ-ACK of a subframe of the secondary serving cell corresponding to a subframe that is forward offset by four subframes and/or forward offset by five subframes from the corresponding subframe 3 is fed back in the subframe 3 of the primary serving cell, an HARQ-ACK of a subframe of the secondary serving cell corresponding to a subframe that is forward offset by four subframes from the corresponding subframe 4 is fed back in the subframe 4 of the primary serving cell, an HARQ-ACK of a subframe of the secondary serving cell corresponding to a subframe that is forward offset by six subframes and/or forward offset by five subframes from the corresponding subframe 7 is fed back in the subframe 7 of the primary serving cell, an HARQ-ACK of a subframe of the secondary serving cell corresponding to a subframe that is forward offset by five subframes and/or forward offset by four subframes from the corresponding subframe 8 is fed back in the subframe 8 of the primary serving cell, and an HARQ-ACK of a subframe of the secondary serving cell corresponding to a subframe that is forward offset by four subframes from the corresponding subframe 9 is fed back in the subframe 9 of the primary serving cell;

when the uplink-downlink configuration of the primary serving cell is the uplink-downlink configuration 1, uplink subframes of the primary serving cell include a subframe 2, a subframe 3, a subframe 7, and a subframe 8, where an HARQ-ACK of a subframe of the secondary serving cell corresponding to a subframe that is forward offset by seven subframes and/or forward offset by six subframes from the corresponding subframe 2 is fed back in the subframe 2 of the primary serving cell, an HARQ-ACK of at least one subframe of the secondary serving cell corresponding to subframes that are forward offset by six subframes, forward offset by five subframes, and forward offset by four subframes from the corresponding subframe 3 is fed back in the subframe 3 of the primary serving cell, an HARQ-ACK of a subframe of the secondary serving cell corresponding to a subframe that is forward offset by seven subframes and/or forward offset by six subframes from the corresponding subframe 7 is fed back in the subframe 7 of the primary serving cell, and an HARQ-ACK of at least one subframe of the secondary serving cell corresponding to subframes that are forward offset by six subframes, forward offset by five subframes, and forward offset by four subframes from the corresponding subframe 8 is fed back in the subframe 8 of the primary serving cell;

when the uplink-downlink configuration of the primary serving cell is the uplink-downlink configuration 2, uplink subframes of the primary serving cell include a subframe 2 and a subframe 7, where an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 2 is fed back in the subframe 2 of the primary serving cell, and an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 7 is fed back in the subframe 7 of the primary serving cell; or when the uplink-downlink configuration of the primary serving cell is the uplink-downlink configuration 6, uplink subframes of the primary serving cell include a subframe 2, a subframe 3, a subframe 4, a subframe 7, and a subframe 8, where an HARQ-ACK of a subframe of the secondary serving cell corresponding to a subframe that is forward offset by eight subframes and/or forward offset by seven subframes from the corresponding subframe 2 is fed back in the subframe 2 of the primary serving cell, an HARQ-ACK of a subframe of the secondary serving cell corresponding to a subframe that is forward offset by seven subframes and/or forward offset by six subframes from the corresponding subframe 3 is fed back in the subframe 3 of the primary serving cell, an HARQ-ACK of a subframe of the secondary serving cell corresponding to a subframe that is forward offset by six subframes and/or forward offset by five subframes from the corresponding subframe 4 is fed back in the subframe 4 of the primary serving cell, an HARQ-ACK of a subframe of the secondary serving cell corresponding to a subframe that is forward offset by seven subframes from the corresponding subframe 7 is fed back in the subframe 7 of the primary serving cell, and an HARQ-ACK of at least one subframe of the secondary serving cell corresponding to subframes that are forward offset by seven subframes, forward offset by six subframes, and forward offset by five subframes from the corresponding subframe 8 is fed back in the subframe 8 of the primary serving cell.

With reference to the first aspect or the first possible implementation manner of the first aspect, in a second possible implementation manner of the first aspect, the uplink subframes of the primary serving cell include uplink subframes that are not uplink subframes of the secondary serving cell.

With reference to the first aspect or the first or the second possible implementation manner of the first aspect, in a third possible implementation manner of the first aspect, when the uplink-downlink configuration of the primary serving cell is the uplink-downlink configuration 0, a quantity of the subframes of the secondary serving cell corresponding to the HARQ-ACKs of the subframes of the secondary serving cell that can be fed back in the subframe 2, the subframe 3, the subframe 7, or the subframe 8 of the primary serving cell is 2, and a quantity of the subframes of the secondary serving cell corresponding to the HARQ-ACKs of the subframes of the secondary serving cell that can be fed back in the subframe 4 or the subframe 9 of the primary serving cell is 1;

when the uplink-downlink configuration of the primary serving cell is the uplink-downlink configuration 1, a quantity of the subframes of the secondary serving cell corresponding to the HARQ-ACKs of the subframes of the secondary serving cell that can be fed back in the subframe 2 or the subframe 7 of the primary serving cell is 2, and a quantity of the subframes of the secondary serving cell corresponding to the HARQ-ACKs of the subframes of the secondary serving cell that can be fed back in the subframe 3 or the subframe 8 of the primary serving cell is 3;

when the uplink-downlink configuration of the primary serving cell is the uplink-downlink configuration 2, a quantity of the subframes of the secondary serving cell corresponding to the HARQ-ACKs of the subframes of the secondary serving cell that can be fed back in the subframe 2 or the subframe 7 of the primary serving cell is 5; or when the uplink-downlink configuration of the primary serving cell is the uplink-downlink configuration 6, a quantity of the subframes of the secondary serving cell corresponding to the HARQ-ACKs of the subframes of the secondary serving cell that can be fed back in the subframe 2, the subframe 3, or the subframe 4 of the primary serving cell is 2, a quantity of the subframes of the secondary serving cell corresponding to the HARQ-ACKs of the subframes of the secondary serving cell that can be fed back in the subframe 7 of the primary serving cell is 1, and a quantity of the subframes of the secondary serving cell corresponding to the HARQ-ACKs of the subframes of the secondary serving cell that can be fed back in the subframe 8 of the primary serving cell is 3.

With reference to the third possible implementation manner of the first aspect, in a fourth possible implementation manner of the first aspect, the UE is full-duplex UE, and the receiving module is specifically configured to:

determine an M value according to a subframe in which the HARQ-ACK corresponding to the PDSCH is received, where the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell;

determine an HARQ-ACK feedback table in a channel selection mode according to the M value; and receive, in the primary serving cell according to the HARQ-ACK feedback table, the HARQ-ACK corresponding to the PDSCH.

With reference to the third possible implementation manner of the first aspect, in a fifth possible implementation manner of the first aspect, the UE is full-duplex UE, and the receiving module is specifically configured to:

determine an M value according to a subframe in which the HARQ-ACK corresponding to the PDSCH is received, where the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell;

determine an HARQ-ACK codebook size in a mode of a physical uplink control channel format 3 according to the M value; and receive, in the primary serving cell according to the HARQ-ACK codebook size, the HARQ-ACK corresponding to the PDSCH.

With reference to the third possible implementation manner of the first aspect, in a sixth possible implementation manner of the first aspect, the UE is half-duplex UE, and the receiving module is specifically configured to:

determine an M value according to a subframe in which the HARQ-ACK corresponding to the PDSCH is received, where the M value is a numeric value obtained after a quantity of uplink subframes in the subframes of the secondary serving cell and a quantity of downlink subframes in the subframes of the secondary serving cell are subtracted from the quantity of the subframes of the secondary serving cell corresponding to the HARQ-ACKs of the subframes of the secondary serving cell that can be fed back in the subframe of the primary serving cell, where a subframe at a same time as the downlink subframe is an uplink subframe or a special subframe in the primary serving cell;

determine an HARQ-ACK feedback table in a channel selection mode according to the M value; and receive, in the primary serving cell according to the HARQ-ACK feedback table, the HARQ-ACK corresponding to the PDSCH.

With reference to the third possible implementation manner of the first aspect, in a seventh possible implementation manner of the first aspect, the UE is half-duplex UE, and the receiving module is specifically configured to:

determine an M value according to a subframe in which the HARQ-ACK corresponding to the PDSCH is received, where the M value is a numeric value obtained after a quantity of uplink subframes in the subframes of the secondary serving cell and a quantity of downlink subframes in the subframes of the secondary serving cell are subtracted from the quantity of the subframes of the secondary serving cell corresponding to the HARQ-ACKs of the subframes of the secondary serving cell that can be fed back in the subframe of the primary serving cell, where a subframe at a same time as the downlink subframe is an uplink subframe or a special subframe in the primary serving cell;

determine an HARQ-ACK codebook size in a mode of a physical uplink control channel format 3 according to the M value; and receive, in the primary serving cell according to the HARQ-ACK codebook size, the HARQ-ACK corresponding to the PDSCH.

With reference to any one of the third to the seventh possible implementation manners of the first aspect, in an eighth possible implementation manner of the first aspect, the receiving module is further configured to:

before the transmission module transmits, in the secondary serving cell, the PDSCH determined by the determining module to the UE, receive capability information reported by the UE, where the capability information is used to indicate whether the UE supports the HARQ time sequence relationship; and the determining module is further configured to:

determine, according to the capability information, that the UE supports the HARQ time sequence relationship.

With reference to any one of the first to the eighth possible implementation manners of the first aspect, in a ninth possible implementation manner of the first aspect, the uplink-downlink configuration of the primary serving cell meets at least one of the following conditions:

when the uplink-downlink configuration of the primary serving cell is the uplink-downlink configuration 0, at least one is subtracted from the subframes of the secondary serving cell corresponding to the HARQ-ACKs of the subframes of the secondary serving cell that are fed back in at least one of the subframe 2, the subframe 3, the subframe 4, the subframe 7, the subframe 8, or the subframe 9 of the primary serving cell;

when the uplink-downlink configuration of the primary serving cell is the uplink-downlink configuration 1, at least one is subtracted from the subframes of the secondary serving cell corresponding to the HARQ-ACKs of the subframes of the secondary serving cell that are fed back in at least one of the subframe 2, the subframe 3, the subframe 7, or the subframe 8 of the primary serving cell;

when the uplink-downlink configuration of the primary serving cell is the uplink-downlink configuration 2, at least one is subtracted from the subframes of the secondary serving cell corresponding to the HARQ-ACKs of the subframes of the secondary serving cell that are fed back in at least one of the subframe 2 or the subframe 7 of the primary serving cell; or when the uplink-downlink configuration of the primary serving cell is the uplink-downlink configuration 6, at least one is subtracted from the subframes of the secondary serving cell corresponding to the HARQ-ACKs of the subframes of the secondary serving cell that are fed back in at least one of the subframe 2, the subframe 3, the subframe 4, the subframe 7, or the subframe 8 of the primary serving cell.

With reference to any one of the first to the eighth possible implementation manners of the first aspect, in a tenth possible implementation manner of the first aspect, when an uplink-downlink configuration of the secondary serving cell is an uplink-downlink configuration 5, the uplink-downlink configuration of the primary serving cell meets at least one of the following conditions:

when the uplink-downlink configuration of the primary serving cell is the uplink-downlink configuration 0, one is subtracted from the subframes of the secondary serving cell corresponding to the HARQ-ACKs of the subframes of the secondary serving cell that are fed back in at least one of the subframe 2, the subframe 3, the subframe 4, the subframe 7, the subframe 8, or the subframe 9 of the primary serving cell;

when the uplink-downlink configuration of the primary serving cell is the uplink-downlink configuration 1, one is subtracted from the subframes of the secondary serving cell corresponding to the HARQ-ACKs of the subframes of the secondary serving cell that are fed back in at least one of the subframe 2, the subframe 3, the subframe 7, or the subframe 8 of the primary serving cell;

when the uplink-downlink configuration of the primary serving cell is the uplink-downlink configuration 2, one is subtracted from the subframes of the secondary serving cell corresponding to the HARQ-ACKs of the subframes of the secondary serving cell that are fed back in at least one of the subframe 2 or the subframe 7 of the primary serving cell; or when the uplink-downlink configuration of the primary serving cell is the uplink-downlink configuration 6, one is subtracted from the subframes of the secondary serving cell corresponding to the HARQ-ACKs of the subframes of the secondary serving cell that are fed back in at least one of the subframe 2, the subframe 3, the subframe 4, the subframe 7, or the subframe 8 of the primary serving cell.

According to a second aspect, an embodiment of the present disclosure provides an apparatus for transmitting acknowledgement information, applied to a time division duplex TDD system, where the apparatus includes:

a receiving module, configured to receive a physical downlink shared channel PDSCH in a secondary serving cell;

a determining module, configured to determine a hybrid automatic repeat request HARQ time sequence relationship corresponding to the secondary serving cell, where the HARQ time sequence relationship is an HARQ time sequence relationship between the PDSCH received by the receiving module and HARQ acknowledgement HARQ-ACK information; and a transmission module, configured to transmit, in a primary serving cell according to the HARQ time sequence relationship determined by the determining module, an HARQ-ACK corresponding to the PDSCH; where the primary serving cell is a TDD primary serving cell configured by a base station for user equipment UE, the secondary serving cell is a secondary serving cell in N TDD secondary serving cells configured by the base station for the UE, and N is a natural number that is greater than or equal to 1.

In a first possible implementation manner of the second aspect, the HARQ time sequence relationship includes:

an uplink-downlink configuration of the primary serving cell is any one of an uplink-downlink configuration 0, an uplink-downlink configuration 1, an uplink-downlink configuration 2, or an uplink-downlink configuration 6, where when the uplink-downlink configuration of the primary serving cell is the uplink-downlink configuration 0, uplink subframes of the primary serving cell include a subframe 2, a subframe 3, a subframe 4, a subframe 7, a subframe 8, and a subframe 9, where an HARQ-ACK of a subframe of the secondary serving cell corresponding to a subframe that is forward offset by five subframes and/or forward offset by six subframes from the corresponding subframe 2 is fed back in the subframe 2 of the primary serving cell, an HARQ-ACK of a subframe of the secondary serving cell corresponding to a subframe that is forward offset by four subframes and/or forward offset by five subframes from the corresponding subframe 3 is fed back in the subframe 3 of the primary serving cell, an HARQ-ACK of a subframe of the secondary serving cell corresponding to a subframe that is forward offset by four subframes from the corresponding subframe 4 is fed back in the subframe 4 of the primary serving cell, an HARQ-ACK of a subframe of the secondary serving cell corresponding to a subframe that is forward offset by six subframes and/or forward offset by five subframes from the corresponding subframe 7 is fed back in the subframe 7 of the primary serving cell, an HARQ-ACK of a subframe of the secondary serving cell corresponding to a subframe that is forward offset by five subframes and/or forward offset by four subframes from the corresponding subframe 8 is fed back in the subframe 8 of the primary serving cell, and an HARQ-ACK of a subframe of the secondary serving cell corresponding to a subframe that is forward offset by four subframes from the corresponding subframe 9 is fed back in the subframe 9 of the primary serving cell;

when the uplink-downlink configuration of the primary serving cell is the uplink-downlink configuration 1, uplink subframes of the primary serving cell include a subframe 2, a subframe 3, a subframe 7, and a subframe 8, where an HARQ-ACK of a subframe of the secondary serving cell corresponding to a subframe that is forward offset by seven subframes and/or forward offset by six subframes from the corresponding subframe 2 is fed back in the subframe 2 of the primary serving cell, an HARQ-ACK of at least one subframe of the secondary serving cell corresponding to subframes that are forward offset by six subframes, forward offset by five subframes, and forward offset by four subframes from the corresponding subframe 3 is fed back in the subframe 3 of the primary serving cell, an HARQ-ACK of a subframe of the secondary serving cell corresponding to a subframe that is forward offset by seven subframes and/or forward offset by six subframes from the corresponding subframe 7 is fed back in the subframe 7 of the primary serving cell, and an HARQ-ACK of at least one subframe of the secondary serving cell corresponding to subframes that are forward offset by six subframes, forward offset by five subframes, and forward offset by four subframes from the corresponding subframe 8 is fed back in the subframe 8 of the primary serving cell;

when the uplink-downlink configuration of the primary serving cell is the uplink-downlink configuration 2, uplink subframes of the primary serving cell include a subframe 2 and a subframe 7, where an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 2 is fed back in the subframe 2 of the primary serving cell, and an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 7 is fed back in the subframe 7 of the primary serving cell; or when the uplink-downlink configuration of the primary serving cell is the uplink-downlink configuration 6, uplink subframes of the primary serving cell include a subframe 2, a subframe 3, a subframe 4, a subframe 7, and a subframe 8, where an HARQ-ACK of a subframe of the secondary serving cell corresponding to a subframe that is forward offset by eight subframes and/or forward offset by seven subframes from the corresponding subframe 2 is fed back in the subframe 2 of the primary serving cell, an HARQ-ACK of a subframe of the secondary serving cell corresponding to a subframe that is forward offset by seven subframes and/or forward offset by six subframes from the corresponding subframe 3 is fed back in the subframe 3 of the primary serving cell, an HARQ-ACK of a subframe of the secondary serving cell corresponding to a subframe that is forward offset by six subframes and/or forward offset by five subframes from the corresponding subframe 4 is fed back in the subframe 4 of the primary serving cell, an HARQ-ACK of a subframe of the secondary serving cell corresponding to a subframe that is forward offset by seven subframes from the corresponding subframe 7 is fed back in the subframe 7 of the primary serving cell, and an HARQ-ACK of at least one subframe of the secondary serving cell corresponding to subframes that are forward offset by seven subframes, forward offset by six subframes, and forward offset by five subframes from the corresponding subframe 8 is fed back in the subframe 8 of the primary serving cell.

With reference to the second aspect or the first possible implementation manner of the second aspect, in a second possible implementation manner of the second aspect, the uplink subframes of the primary serving cell include uplink subframes that are not uplink subframes of the secondary serving cell.

With reference to the second aspect or the first or the second possible implementation manner of the second aspect, in a third possible implementation manner of the second aspect, when the uplink-downlink configuration of the primary serving cell is the uplink-downlink configuration 0, a quantity of the subframes of the secondary serving cell corresponding to the HARQ-ACKs of the subframes of the secondary serving cell that can be fed back in the subframe 2, the subframe 3, the subframe 7, or the subframe 8 of the primary serving cell is 2, and a quantity of the subframes of the secondary serving cell corresponding to the HARQ-ACKs of the subframes of the secondary serving cell that can be fed back in the subframe 4 or the subframe 9 of the primary serving cell is 1;

when the uplink-downlink configuration of the primary serving cell is the uplink-downlink configuration 1, a quantity of the subframes of the secondary serving cell corresponding to the HARQ-ACKs of the subframes of the secondary serving cell that can be fed back in the subframe 2 or the subframe 7 of the primary serving cell is 2, and a quantity of the subframes of the secondary serving cell corresponding to the HARQ-ACKs of the subframes of the secondary serving cell that can be fed back in the subframe 3 or the subframe 8 of the primary serving cell is 3;

when the uplink-downlink configuration of the primary serving cell is the uplink-downlink configuration 2, a quantity of the subframes of the secondary serving cell corresponding to the HARQ-ACKs of the subframes of the secondary serving cell that can be fed back in the subframe 2 or the subframe 7 of the primary serving cell is 5; or when the uplink-downlink configuration of the primary serving cell is the uplink-downlink configuration 6, a quantity of the subframes of the secondary serving cell corresponding to the HARQ-ACKs of the subframes of the secondary serving cell that can be fed back in the subframe 2, the subframe 3, or the subframe 4 of the primary serving cell is 2, a quantity of the subframes of the secondary serving cell corresponding to the HARQ-ACKs of the subframes of the secondary serving cell that can be fed back in the subframe 7 of the primary serving cell is 1, and a quantity of the subframes of the secondary serving cell corresponding to the HARQ-ACKs of the subframes of the secondary serving cell that can be fed back in the subframe 8 of the primary serving cell is 3.

With reference to the third possible implementation manner of the second aspect, in a fourth possible implementation manner of the second aspect, the UE is full-duplex UE, and the transmission module is specifically configured to:

determine an M value according to a subframe in which the HARQ-ACK corresponding to the PDSCH is transmitted, where the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell;

determine an HARQ-ACK feedback table in a channel selection mode according to the M value; and transmit, in the primary serving cell according to the HARQ-ACK feedback table, the HARQ-ACK corresponding to the PDSCH.

With reference to the third possible implementation manner of the second aspect, in a fifth possible implementation manner of the second aspect, the UE is full-duplex UE, and the transmission module is specifically configured to:

determine an M value according to a subframe in which the HARQ-ACK corresponding to the PDSCH is transmitted, where the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell;

determine an HARQ-ACK codebook size in a mode of a physical uplink control channel format 3 according to the M value; and transmit, in the primary serving cell according to the HARQ-ACK codebook size, the HARQ-ACK corresponding to the PDSCH.

With reference to the third possible implementation manner of the second aspect, in a sixth possible implementation manner of the second aspect, the UE is half-duplex UE, and the transmission module is specifically configured to:

determine an M value according to a subframe in which the HARQ-ACK corresponding to the PDSCH is transmitted, where the M value is a numeric value obtained after a quantity of uplink subframes in the subframes of the secondary serving cell and a quantity of downlink subframes in the subframes of the secondary serving cell are subtracted from the quantity of the subframes of the secondary serving cell corresponding to the HARQ-ACKs of the subframes of the secondary serving cell that can be fed back in the subframe of the primary serving cell, where a subframe at a same time as the downlink subframe is an uplink subframe or a special subframe in the primary serving cell, where a subframe at a same time as the downlink subframe is an uplink subframe or a special subframe in the primary serving cell;

determine an HARQ-ACK feedback table in a channel selection mode according to the M value; and transmit, in the primary serving cell according to the HARQ-ACK feedback table, the HARQ-ACK corresponding to the PDSCH.

With reference to the third possible implementation manner of the second aspect, in a seventh possible implementation manner of the second aspect, the UE is half-duplex UE, and the transmission module is specifically configured to:

determine an M value according to a subframe in which the HARQ-ACK corresponding to the PDSCH is transmitted, where the M value is a numeric value obtained after a quantity of uplink subframes in the subframes of the secondary serving cell and a quantity of downlink subframes in the subframes of the secondary serving cell are subtracted from the quantity of the subframes of the secondary serving cell corresponding to the HARQ-ACKs of the subframes of the secondary serving cell that can be fed back in the subframe of the primary serving cell, where a subframe at a same time as the downlink subframe is an uplink subframe or a special subframe in the primary serving cell;

determine an HARQ-ACK codebook size in a mode of a physical uplink control channel format 3 according to the M value; and transmit, in the primary serving cell according to the HARQ-ACK codebook size, the HARQ-ACK corresponding to the PDSCH.

With reference to any one of the third to the seventh possible implementation manners of the second aspect, in an eighth possible implementation manner of the second aspect, the transmission module is further configured to:

before the receiving module receives the PDSCH in the secondary serving cell, report capability information to the base station, where the capability information is used to indicate whether the UE supports the HARQ time sequence relationship; and the determining module is further configured to:

determine, according to the capability information, that the apparatus supports the HARQ time sequence relationship.

With reference to any one of the first to the eighth possible implementation manners of the second aspect, in a ninth possible implementation manner of the second aspect, the uplink-downlink configuration of the primary serving cell meets at least one of the following conditions:

when the uplink-downlink configuration of the primary serving cell is the uplink-downlink configuration 0, at least one is subtracted from the subframes of the secondary serving cell corresponding to the HARQ-ACKs of the subframes of the secondary serving cell that are fed back in at least one of the subframe 2, the subframe 3, the subframe 4, the subframe 7, the subframe 8, or the subframe 9 of the primary serving cell;

when the uplink-downlink configuration of the primary serving cell is the uplink-downlink configuration 1, at least one is subtracted from the subframes of the secondary serving cell corresponding to the HARQ-ACKs of the subframes of the secondary serving cell that are fed back in at least one of the subframe 2, the subframe 3, the subframe 7, or the subframe 8 of the primary serving cell;

when the uplink-downlink configuration of the primary serving cell is the uplink-downlink configuration 2, at least one is subtracted from the subframes of the secondary serving cell corresponding to the HARQ-ACKs of the subframes of the secondary serving cell that are fed back in at least one of the subframe 2 or the subframe 7 of the primary serving cell; or when the uplink-downlink configuration of the primary serving cell is the uplink-downlink configuration 6, at least one is subtracted from the subframes of the secondary serving cell corresponding to the HARQ-ACKs of the subframes of the secondary serving cell that are fed back in at least one of the subframe 2, the subframe 3, the subframe 4, the subframe 7, or the subframe 8 of the primary serving cell.

With reference to any one of the first to the eighth possible implementation manners of the second aspect, in a tenth possible implementation manner of the second aspect, when an uplink-downlink configuration of the secondary serving cell is an uplink-downlink configuration 5, the uplink-downlink configuration of the primary serving cell meets at least one of the following conditions:

when the uplink-downlink configuration of the primary serving cell is the uplink-downlink configuration 0, one is subtracted from the subframes of the secondary serving cell corresponding to the HARQ-ACKs of the subframes of the secondary serving cell that are fed back in at least one of the subframe 2, the subframe 3, the subframe 4, the subframe 7, the subframe 8, or the subframe 9 of the primary serving cell;

when the uplink-downlink configuration of the primary serving cell is the uplink-downlink configuration 1, one is subtracted from the subframes of the secondary serving cell corresponding to the HARQ-ACKs of the subframes of the secondary serving cell that are fed back in at least one of the subframe 2, the subframe 3, the subframe 7, or the subframe 8 of the primary serving cell;

when the uplink-downlink configuration of the primary serving cell is the uplink-downlink configuration 2, one is subtracted from the subframes of the secondary serving cell corresponding to the HARQ-ACKs of the subframes of the secondary serving cell that are fed back in at least one of the subframe 2 or the subframe 7 of the primary serving cell; or when the uplink-downlink configuration of the primary serving cell is the uplink-downlink configuration 6, one is subtracted from the subframes of the secondary serving cell corresponding to the HARQ-ACKs of the subframes of the secondary serving cell that are fed back in at least one of the subframe 2, the subframe 3, the subframe 4, the subframe 7, or the subframe 8 of the primary serving cell.

According to a third aspect, an embodiment of the present disclosure provides a device for transmitting acknowledgement information, applied to a time division duplex TDD system, where the device includes a processor, a transmitter, and a receiver, where the processor is configured to determine to transmit, in a secondary serving cell, a physical downlink shared channel PDSCH to user equipment UE;

the transmitter is configured to transmit, in the secondary serving cell, the PDSCH determined by the processor to the UE;

the processor is further configured to determine a hybrid automatic repeat request HARQ time sequence relationship corresponding to the secondary serving cell, where the HARQ time sequence relationship is an HARQ time sequence relationship between the PDSCH and HARQ acknowledgement HARQ-ACK information; and the receiver is configured to receive, in a primary serving cell according to the HARQ time sequence relationship determined by the processor, an HARQ-ACK corresponding to the PDSCH; where the primary serving cell is a TDD primary serving cell configured by a base station for the UE, the secondary serving cell is a secondary serving cell in N TDD secondary serving cells configured by the base station for the UE, and N is a natural number that is greater than or equal to 1.

According to a fourth aspect, an embodiment of the present disclosure provides a device for transmitting acknowledgement information, applied to a time division duplex TDD system, where the device includes a processor, a receiver, and a transmitter, where the receiver is configured to receive a physical downlink shared channel PDSCH in a secondary serving cell;

the processor is configured to determine a hybrid automatic repeat request HARQ time sequence relationship corresponding to the secondary serving cell, where the HARQ time sequence relationship is an HARQ time sequence relationship between the PDSCH received by the receiver and HARQ acknowledgement HARQ-ACK information; and the transmitter is configured to transmit, in a primary serving cell according to the HARQ time sequence relationship determined by the processor, an HARQ-ACK corresponding to the PDSCH; where the primary serving cell is a TDD primary serving cell configured by a base station for user equipment UE, the secondary serving cell is a secondary serving cell in N TDD secondary serving cells configured by the base station for the UE, and N is a natural number that is greater than or equal to 1.

According to a fifth aspect, an embodiment of the present disclosure provides a method for transmitting acknowledgement information, applied to a time division duplex TDD system, where the method includes:

determining to transmit, in a secondary serving cell, a physical downlink shared channel PDSCH to user equipment UE;

transmitting, in the secondary serving cell, the PDSCH to the UE;

determining a hybrid automatic repeat request HARQ time sequence relationship corresponding to the secondary serving cell, where the HARQ time sequence relationship is an HARQ time sequence relationship between the PDSCH and HARQ acknowledgement HARQ-ACK information; and receiving, in a primary serving cell according to the HARQ time sequence relationship, an HARQ-ACK corresponding to the PDSCH; where the primary serving cell is a TDD primary serving cell configured by a base station for the UE, the secondary serving cell is a secondary serving cell in N TDD secondary serving cells configured by the base station for the UE, and N is a natural number that is greater than or equal to 1.

In a first possible implementation manner of the fifth aspect, the HARQ time sequence relationship includes:

an uplink-downlink configuration of the primary serving cell is any one of an uplink-downlink configuration 0, an uplink-downlink configuration 1, an uplink-downlink configuration 2, or an uplink-downlink configuration 6, where when the uplink-downlink configuration of the primary serving cell is the uplink-downlink configuration 0, uplink subframes of the primary serving cell include a subframe 2, a subframe 3, a subframe 4, a subframe 7, a subframe 8, and a subframe 9, where an HARQ-ACK of a subframe of the secondary serving cell corresponding to a subframe that is forward offset by five subframes and/or forward offset by six subframes from the corresponding subframe 2 is fed back in the subframe 2 of the primary serving cell, an HARQ-ACK of a subframe of the secondary serving cell corresponding to a subframe that is forward offset by four subframes and/or forward offset by five subframes from the corresponding subframe 3 is fed back in the subframe 3 of the primary serving cell, an HARQ-ACK of a subframe of the secondary serving cell corresponding to a subframe that is forward offset by four subframes from the corresponding subframe 4 is fed back in the subframe 4 of the primary serving cell, an HARQ-ACK of a subframe of the secondary serving cell corresponding to a subframe that is forward offset by six subframes and/or forward offset by five subframes from the corresponding subframe 7 is fed back in the subframe 7 of the primary serving cell, an HARQ-ACK of a subframe of the secondary serving cell corresponding to a subframe that is forward offset by five subframes and/or forward offset by four subframes from the corresponding subframe 8 is fed back in the subframe 8 of the primary serving cell, and an HARQ-ACK of a subframe of the secondary serving cell corresponding to a subframe that is forward offset by four subframes from the corresponding subframe 9 is fed back in the subframe 9 of the primary serving cell;

when the uplink-downlink configuration of the primary serving cell is the uplink-downlink configuration 1, uplink subframes of the primary serving cell include a subframe 2, a subframe 3, a subframe 7, and a subframe 8, where an HARQ-ACK of a subframe of the secondary serving cell corresponding to a subframe that is forward offset by seven subframes and/or forward offset by six subframes from the corresponding subframe 2 is fed back in the subframe 2 of the primary serving cell, an HARQ-ACK of at least one subframe of the secondary serving cell corresponding to subframes that are forward offset by six subframes, forward offset by five subframes, and forward offset by four subframes from the corresponding subframe 3 is fed back in the subframe 3 of the primary serving cell, an HARQ-ACK of a subframe of the secondary serving cell corresponding to a subframe that is forward offset by seven subframes and/or forward offset by six subframes from the corresponding subframe 7 is fed back in the subframe 7 of the primary serving cell, and an HARQ-ACK of at least one subframe of the secondary serving cell corresponding to subframes that are forward offset by six subframes, forward offset by five subframes, and forward offset by four subframes from the corresponding subframe 8 is fed back in the subframe 8 of the primary serving cell;

when the uplink-downlink configuration of the primary serving cell is the uplink-downlink configuration 2, uplink subframes of the primary serving cell include a subframe 2 and a subframe 7, where an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 2 is fed back in the subframe 2 of the primary serving cell, and an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 7 is fed back in the subframe 7 of the primary serving cell; or when the uplink-downlink configuration of the primary serving cell is the uplink-downlink configuration 6, uplink subframes of the primary serving cell include a subframe 2, a subframe 3, a subframe 4, a subframe 7, and a subframe 8, where an HARQ-ACK of a subframe of the secondary serving cell corresponding to a subframe that is forward offset by eight subframes and/or forward offset by seven subframes from the corresponding subframe 2 is fed back in the subframe 2 of the primary serving cell, an HARQ-ACK of a subframe of the secondary serving cell corresponding to a subframe that is forward offset by seven subframes and/or forward offset by six subframes from the corresponding subframe 3 is fed back in the subframe 3 of the primary serving cell, an HARQ-ACK of a subframe of the secondary serving cell corresponding to a subframe that is forward offset by six subframes and/or forward offset by five subframes from the corresponding subframe 4 is fed back in the subframe 4 of the primary serving cell, an HARQ-ACK of a subframe of the secondary serving cell corresponding to a subframe that is forward offset by seven subframes from the corresponding subframe 7 is fed back in the subframe 7 of the primary serving cell, and an HARQ-ACK of at least one subframe of the secondary serving cell corresponding to subframes that are forward offset by seven subframes, forward offset by six subframes, and forward offset by five subframes from the corresponding subframe 8 is fed back in the subframe 8 of the primary serving cell.

With reference to the fifth aspect or the first possible implementation manner of the fifth aspect, in a second possible implementation manner of the fifth aspect, the uplink subframes of the primary serving cell include uplink subframes that are not uplink subframes of the secondary serving cell.

With reference to the fifth aspect or the first or the second possible implementation manner of the fifth aspect, in a third possible implementation manner of the fifth aspect, when the uplink-downlink configuration of the primary serving cell is the uplink-downlink configuration 0, a quantity of the subframes of the secondary serving cell corresponding to the HARQ-ACKs of the subframes of the secondary serving cell that can be fed back in the subframe 2, the subframe 3, the subframe 7, or the subframe 8 of the primary serving cell is 2, and a quantity of the subframes of the secondary serving cell corresponding to the HARQ-ACKs of the subframes of the secondary serving cell that can be fed back in the subframe 4 or the subframe 9 of the primary serving cell is 1;

when the uplink-downlink configuration of the primary serving cell is the uplink-downlink configuration 1, a quantity of the subframes of the secondary serving cell corresponding to the HARQ-ACKs of the subframes of the secondary serving cell that can be fed back in the subframe 2 or the subframe 7 of the primary serving cell is 2, and a quantity of the subframes of the secondary serving cell corresponding to the HARQ-ACKs of the subframes of the secondary serving cell that can be fed back in the subframe 3 or the subframe 8 of the primary serving cell is 3;

when the uplink-downlink configuration of the primary serving cell is the uplink-downlink configuration 2, a quantity of the subframes of the secondary serving cell corresponding to the HARQ-ACKs of the subframes of the secondary serving cell that can be fed back in the subframe 2 or the subframe 7 of the primary serving cell is 5; or when the uplink-downlink configuration of the primary serving cell is the uplink-downlink configuration 6, a quantity of the subframes of the secondary serving cell corresponding to the HARQ-ACKs of the subframes of the secondary serving cell that can be fed back in the subframe 2, the subframe 3, or the subframe 4 of the primary serving cell is 2, a quantity of the subframes of the secondary serving cell corresponding to the HARQ-ACKs of the subframes of the secondary serving cell that can be fed back in the subframe 7 of the primary serving cell is 1, and a quantity of the subframes of the secondary serving cell corresponding to the HARQ-ACKs of the subframes of the secondary serving cell that can be fed back in the subframe 8 of the primary serving cell is 3.

With reference to the third possible implementation manner of the fifth aspect, in a fourth possible implementation manner of the fifth aspect, the UE is full-duplex UE, and the receiving, in a primary serving cell according to the HARQ time sequence relationship, an HARQ-ACK corresponding to the PDSCH, includes:

determining an M value according to a subframe in which the HARQ-ACK corresponding to the PDSCH is received, where the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell;

determining an HARQ-ACK feedback table in a channel selection mode according to the M value; and receiving, in the primary serving cell according to the HARQ-ACK feedback table, the HARQ-ACK corresponding to the PDSCH.

With reference to the third possible implementation manner of the fifth aspect, in a fifth possible implementation manner of the fifth aspect, the UE is full-duplex UE, and the receiving, in a primary serving cell according to the HARQ time sequence relationship, an HARQ-ACK corresponding to the PDSCH, includes:

determining an M value according to a subframe in which the HARQ-ACK corresponding to the PDSCH is received, where the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell;

determining an HARQ-ACK codebook size in a mode of a physical uplink control channel format 3 according to the M value; and receiving, in the primary serving cell according to the HARQ-ACK codebook size, the HARQ-ACK corresponding to the PDSCH.

With reference to the third possible implementation manner of the fifth aspect, in a sixth possible implementation manner of the fifth aspect, the UE is half-duplex UE, and the receiving, in a primary serving cell according to the HARQ time sequence relationship, an HARQ-ACK corresponding to the PDSCH, includes:

determining an M value according to a subframe in which the HARQ-ACK corresponding to the PDSCH is received, where the M value is a numeric value obtained after a quantity of uplink subframes in the subframes of the secondary serving cell and a quantity of downlink subframes in the subframes of the secondary serving cell are subtracted from the quantity of the subframes of the secondary serving cell corresponding to the HARQ-ACKs of the subframes of the secondary serving cell that can be fed back in the subframe of the primary serving cell, where a subframe at a same time as the downlink subframe is an uplink subframe or a special subframe in the primary serving cell;

determining an HARQ-ACK feedback table in a channel selection mode according to the M value; and receiving, in the primary serving cell according to the HARQ-ACK feedback table, the HARQ-ACK corresponding to the PDSCH.

With reference to the third possible implementation manner of the fifth aspect, in a seventh possible implementation manner of the fifth aspect, the UE is half-duplex UE, and the receiving, in a primary serving cell according to the HARQ time sequence relationship, an HARQ-ACK corresponding to the PDSCH, includes:

determining an M value according to a subframe in which the HARQ-ACK corresponding to the PDSCH is received, where the M value is a numeric value obtained after a quantity of uplink subframes in the subframes of the secondary serving cell and a quantity of downlink subframes in the subframes of the secondary serving cell are subtracted from the quantity of the subframes of the secondary serving cell corresponding to the HARQ-ACKs of the subframes of the secondary serving cell that can be fed back in the subframe of the primary serving cell, where a subframe at a same time as the downlink subframe is an uplink subframe or a special subframe in the primary serving cell;

determining an HARQ-ACK codebook size in a mode of a physical uplink control channel format 3 according to the M value; and receiving, in the primary serving cell according to the HARQ-ACK codebook size, the HARQ-ACK corresponding to the PDSCH.

With reference to any one of the third to the seventh possible implementation manners of the fifth aspect, in an eighth possible implementation manners of the fifth aspect, before the transmitting, in the secondary serving cell, the PDSCH to the UE, the method further includes:

receiving capability information reported by the UE, where the capability information is used to indicate whether the UE supports the HARQ time sequence relationship; and determining, according to the capability information, that the UE supports the HARQ time sequence relationship.

With reference to any one of the first to the eighth possible implementation manners of the fifth aspect, in a ninth possible implementation manner of the fifth aspect, the uplink-downlink configuration of the primary serving cell meets at least one of the following conditions:

when the uplink-downlink configuration of the primary serving cell is the uplink-downlink configuration 0, at least one is subtracted from the subframes of the secondary serving cell corresponding to the HARQ-ACKs of the subframes of the secondary serving cell that are fed back in at least one of the subframe 2, the subframe 3, the subframe 4, the subframe 7, the subframe 8, or the subframe 9 of the primary serving cell;

when the uplink-downlink configuration of the primary serving cell is the uplink-downlink configuration 1, at least one is subtracted from the subframes of the secondary serving cell corresponding to the HARQ-ACKs of the subframes of the secondary serving cell that are fed back in at least one of the subframe 2, the subframe 3, the subframe 7, or the subframe 8 of the primary serving cell;

when the uplink-downlink configuration of the primary serving cell is the uplink-downlink configuration 2, at least one is subtracted from the subframes of the secondary serving cell corresponding to the HARQ-ACKs of the subframes of the secondary serving cell that are fed back in at least one of the subframe 2 or the subframe 7 of the primary serving cell; or when the uplink-downlink configuration of the primary serving cell is the uplink-downlink configuration 6, at least one is subtracted from the subframes of the secondary serving cell corresponding to the HARQ-ACKs of the subframes of the secondary serving cell that are fed back in at least one of the subframe 2, the subframe 3, the subframe 4, the subframe 7, or the subframe 8 of the primary serving cell.

With reference to any one of the first to the eighth possible implementation manners of the fifth aspect, in a tenth possible implementation manner of the fifth aspect, when an uplink-downlink configuration of the secondary serving cell is an uplink-downlink configuration 5, the uplink-downlink configuration of the primary serving cell meets at least one of the following conditions:

when the uplink-downlink configuration of the primary serving cell is the uplink-downlink configuration 0, one is subtracted from the subframes of the secondary serving cell corresponding to the HARQ-ACKs of the subframes of the secondary serving cell that are fed back in at least one of the subframe 2, the subframe 3, the subframe 4, the subframe 7, the subframe 8, or the subframe 9 of the primary serving cell;

when the uplink-downlink configuration of the primary serving cell is the uplink-downlink configuration 1, one is subtracted from the subframes of the secondary serving cell corresponding to the HARQ-ACKs of the subframes of the secondary serving cell that are fed back in at least one of the subframe 2, the subframe 3, the subframe 7, or the subframe 8 of the primary serving cell;

when the uplink-downlink configuration of the primary serving cell is the uplink-downlink configuration 2, one is subtracted from the subframes of the secondary serving cell corresponding to the HARQ-ACKs of the subframes of the secondary serving cell that are fed back in at least one of the subframe 2 or the subframe 7 of the primary serving cell; or when the uplink-downlink configuration of the primary serving cell is the uplink-downlink configuration 6, one is subtracted from the subframes of the secondary serving cell corresponding to the HARQ-ACKs of the subframes of the secondary serving cell that are fed back in at least one of the subframe 2, the subframe 3, the subframe 4, the subframe 7, or the subframe 8 of the primary serving cell.

According to a sixth aspect, an embodiment of the present disclosure provides a method for transmitting acknowledgement information, applied to a time division duplex TDD system, where the method includes:

receiving a physical downlink shared channel PDSCH in a secondary serving cell;

determining a hybrid automatic repeat request HARQ time sequence relationship corresponding to the secondary serving cell, where the HARQ time sequence relationship is an HARQ time sequence relationship between the PDSCH and HARQ acknowledgement HARQ-ACK information; and transmitting, in a primary serving cell according to the HARQ time sequence relationship, an HARQ-ACK corresponding to the PDSCH; where the primary serving cell is a TDD primary serving cell configured by a base station for user equipment UE, the secondary serving cell is a secondary serving cell in N TDD secondary serving cells configured by the base station for the UE, and N is a natural number that is greater than or equal to 1.

In a first possible implementation manner of the sixth aspect, the HARQ time sequence relationship includes:

an uplink-downlink configuration of the primary serving cell is any one of an uplink-downlink configuration 0, an uplink-downlink configuration 1, an uplink-downlink configuration 2, or an uplink-downlink configuration 6, where when the uplink-downlink configuration of the primary serving cell is the uplink-downlink configuration 0, uplink subframes of the primary serving cell include a subframe 2, a subframe 3, a subframe 4, a subframe 7, a subframe 8, and a subframe 9, where an HARQ-ACK of a subframe of the secondary serving cell corresponding to a subframe that is forward offset by five subframes and/or forward offset by six subframes from the corresponding subframe 2 is fed back in the subframe 2 of the primary serving cell, an HARQ-ACK of a subframe of the secondary serving cell corresponding to a subframe that is forward offset by four subframes and/or forward offset by five subframes from the corresponding subframe 3 is fed back in the subframe 3 of the primary serving cell, an HARQ-ACK of a subframe of the secondary serving cell corresponding to a subframe that is forward offset by four subframes from the corresponding subframe 4 is fed back in the subframe 4 of the primary serving cell, an HARQ-ACK of a subframe of the secondary serving cell corresponding to a subframe that is forward offset by six subframes and/or forward offset by five subframes from the corresponding subframe 7 is fed back in the subframe 7 of the primary serving cell, an HARQ-ACK of a subframe of the secondary serving cell corresponding to a subframe that is forward offset by five subframes and/or forward offset by four subframes from the corresponding subframe 8 is fed back in the subframe 8 of the primary serving cell, and an HARQ-ACK of a subframe of the secondary serving cell corresponding to a subframe that is forward offset by four subframes from the corresponding subframe 9 is fed back in the subframe 9 of the primary serving cell;

when the uplink-downlink configuration of the primary serving cell is the uplink-downlink configuration 1, uplink subframes of the primary serving cell include a subframe 2, a subframe 3, a subframe 7, and a subframe 8, where an HARQ-ACK of a subframe of the secondary serving cell corresponding to a subframe that is forward offset by seven subframes and/or forward offset by six subframes from the corresponding subframe 2 is fed back in the subframe 2 of the primary serving cell, an HARQ-ACK of at least one subframe of the secondary serving cell corresponding to subframes that are forward offset by six subframes, forward offset by five subframes, and forward offset by four subframes from the corresponding subframe 3 is fed back in the subframe 3 of the primary serving cell, an HARQ-ACK of a subframe of the secondary serving cell corresponding to a subframe that is forward offset by seven subframes and/or forward offset by six subframes from the corresponding subframe 7 is fed back in the subframe 7 of the primary serving cell, and an HARQ-ACK of at least one subframe of the secondary serving cell corresponding to subframes that are forward offset by six subframes, forward offset by five subframes, and forward offset by four subframes from the corresponding subframe 8 is fed back in the subframe 8 of the primary serving cell;

when the uplink-downlink configuration of the primary serving cell is the uplink-downlink configuration 2, uplink subframes of the primary serving cell include a subframe 2 and a subframe 7, where an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 2 is fed back in the subframe 2 of the primary serving cell, and an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 7 is fed back in the subframe 7 of the primary serving cell; or when the uplink-downlink configuration of the primary serving cell is the uplink-downlink configuration 6, uplink subframes of the primary serving cell include a subframe 2, a subframe 3, a subframe 4, a subframe 7, and a subframe 8, where an HARQ-ACK of a subframe of the secondary serving cell corresponding to a subframe that is forward offset by eight subframes and/or forward offset by seven subframes from the corresponding subframe 2 is fed back in the subframe 2 of the primary serving cell, an HARQ-ACK of a subframe of the secondary serving cell corresponding to a subframe that is forward offset by seven subframes and/or forward offset by six subframes from the corresponding subframe 3 is fed back in the subframe 3 of the primary serving cell, an HARQ-ACK of a subframe of the secondary serving cell corresponding to a subframe that is forward offset by six subframes and/or forward offset by five subframes from the corresponding subframe 4 is fed back in the subframe 4 of the primary serving cell, an HARQ-ACK of a subframe of the secondary serving cell corresponding to a subframe that is forward offset by seven subframes from the corresponding subframe 7 is fed back in the subframe 7 of the primary serving cell, and an HARQ-ACK of at least one subframe of the secondary serving cell corresponding to subframes that are forward offset by seven subframes, forward offset by six subframes, and forward offset by five subframes from the corresponding subframe 8 is fed back in the subframe 8 of the primary serving cell.

With reference to the sixth aspect or the first possible implementation manner of the sixth aspect, in a second possible implementation manner of the sixth aspect, the uplink subframes of the primary serving cell include uplink subframes that are not uplink subframes of the secondary serving cell.

With reference to the sixth aspect or the first or the second possible implementation manner of the sixth aspect, in a third possible implementation manner of the sixth aspect, when the uplink-downlink configuration of the primary serving cell is the uplink-downlink configuration 0, a quantity of the subframes of the secondary serving cell corresponding to the HARQ-ACKs of the subframes of the secondary serving cell that can be fed back in the subframe 2, the subframe 3, the subframe 7, or the subframe 8 of the primary serving cell is 2, and a quantity of the subframes of the secondary serving cell corresponding to the HARQ-ACKs of the subframes of the secondary serving cell that can be fed back in the subframe 4 or the subframe 9 of the primary serving cell is 1;

when the uplink-downlink configuration of the primary serving cell is the uplink-downlink configuration 1, a quantity of the subframes of the secondary serving cell corresponding to the HARQ-ACKs of the subframes of the secondary serving cell that can be fed back in the subframe 2 or the subframe 7 of the primary serving cell is 2, and a quantity of the subframes of the secondary serving cell corresponding to the HARQ-ACKs of the subframes of the secondary serving cell that can be fed back in the subframe 3 or the subframe 8 of the primary serving cell is 3;

when the uplink-downlink configuration of the primary serving cell is the uplink-downlink configuration 2, a quantity of the subframes of the secondary serving cell corresponding to the HARQ-ACKs of the subframes of the secondary serving cell that can be fed back in the subframe 2 or the subframe 7 of the primary serving cell is 5; or when the uplink-downlink configuration of the primary serving cell is the uplink-downlink configuration 6, a quantity of the subframes of the secondary serving cell corresponding to the HARQ-ACKs of the subframes of the secondary serving cell that can be fed back in the subframe 2, the subframe 3, or the subframe 4 of the primary serving cell is 2, a quantity of the subframes of the secondary serving cell corresponding to the HARQ-ACKs of the subframes of the secondary serving cell that can be fed back in the subframe 7 of the primary serving cell is 1, and a quantity of the subframes of the secondary serving cell corresponding to the HARQ-ACKs of the subframes of the secondary serving cell that can be fed back in the subframe 8 of the primary serving cell is 3.

With reference to the third possible implementation manner of the sixth aspect, in a fourth possible implementation manner of the sixth aspect, the UE is full-duplex UE, and the transmitting, in a primary serving cell according to the HARQ time sequence relationship, an HARQ-ACK corresponding to the PDSCH, includes:

determining an M value according to a subframe in which the HARQ-ACK corresponding to the PDSCH is transmitted, where the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell;

determining an HARQ-ACK feedback table in a channel selection mode according to the M value; and transmitting, in the primary serving cell according to the HARQ-ACK feedback table, the HARQ-ACK corresponding to the PDSCH.

With reference to the third possible implementation manner of the sixth aspect, in a fifth possible implementation manner of the sixth aspect, the UE is full-duplex UE, and the transmitting, in a primary serving cell according to the HARQ time sequence relationship, an HARQ-ACK corresponding to the PDSCH, includes:

determining an M value according to a subframe in which the HARQ-ACK corresponding to the PDSCH is transmitted, where the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell;

determining an HARQ-ACK codebook size in a mode of a physical uplink control channel format 3 according to the M value; and transmitting, in the primary serving cell according to the HARQ-ACK codebook size, the HARQ-ACK corresponding to the PDSCH.

With reference to the third possible implementation manner of the sixth aspect, in a sixth possible implementation manner of the sixth aspect, the UE is half-duplex UE, and the transmitting, in a primary serving cell according to the HARQ time sequence relationship, an HARQ-ACK corresponding to the PDSCH, includes:

determining an M value according to a subframe in which the HARQ-ACK corresponding to the PDSCH is transmitted, where the M value is a numeric value obtained after a quantity of uplink subframes in the subframes of the secondary serving cell and a quantity of downlink subframes in the subframes of the secondary serving cell are subtracted from the quantity of the subframes of the secondary serving cell corresponding to the HARQ-ACKs of the subframes of the secondary serving cell that can be fed back in the subframe of the primary serving cell, where a subframe at a same time as the downlink subframe is an uplink subframe or a special subframe in the primary serving cell, where a subframe at a same time as the downlink subframe is an uplink subframe or a special subframe in the primary serving cell;

determining an HARQ-ACK feedback table in a channel selection mode according to the M value; and transmitting, in the primary serving cell according to the HARQ-ACK feedback table, the HARQ-ACK corresponding to the PDSCH.

With reference to the third possible implementation manner of the sixth aspect, in a seventh possible implementation manner of the sixth aspect, the UE is half-duplex UE, and the transmitting, in a primary serving cell according to the HARQ time sequence relationship, an HARQ-ACK corresponding to the PDSCH, includes:

determining an M value according to a subframe in which the HARQ-ACK corresponding to the PDSCH is transmitted, where the M value is a numeric value obtained after a quantity of uplink subframes in the subframes of the secondary serving cell and a quantity of downlink subframes in the subframes of the secondary serving cell are subtracted from the quantity of the subframes of the secondary serving cell corresponding to the HARQ-ACKs of the subframes of the secondary serving cell that can be fed back in the subframe of the primary serving cell, where a subframe at a same time as the downlink subframe is an uplink subframe or a special subframe in the primary serving cell;

determining an HARQ-ACK codebook size in a mode of a physical uplink control channel format 3 according to the M value; and transmitting, in the primary serving cell according to the HARQ-ACK codebook size, the HARQ-ACK corresponding to the PDSCH.

With reference to any one of the third to the seventh possible implementation manners of the sixth aspect, in an eighth possible implementation manners of the sixth aspect, before the receiving a PDSCH in a secondary serving cell, the method further includes:

reporting capability information to the base station, where the capability information is used to indicate whether the UE supports the HARQ time sequence relationship; and determining, according to the capability information, that the UE supports the HARQ time sequence relationship.

With reference to any one of the first to the eighth possible implementation manners of the sixth aspect, in a ninth possible implementation manner of the sixth aspect, the uplink-downlink configuration of the primary serving cell meets at least one of the following conditions:

when the uplink-downlink configuration of the primary serving cell is the uplink-downlink configuration 0, at least one is subtracted from the subframes of the secondary serving cell corresponding to the HARQ-ACKs of the subframes of the secondary serving cell that are fed back in at least one of the subframe 2, the subframe 3, the subframe 4, the subframe 7, the subframe 8, or the subframe 9 of the primary serving cell;

when the uplink-downlink configuration of the primary serving cell is the uplink-downlink configuration 1, at least one is subtracted from the subframes of the secondary serving cell corresponding to the HARQ-ACKs of the subframes of the secondary serving cell that are fed back in at least one of the subframe 2, the subframe 3, the subframe 7, or the subframe 8 of the primary serving cell;

when the uplink-downlink configuration of the primary serving cell is the uplink-downlink configuration 2, at least one is subtracted from the subframes of the secondary serving cell corresponding to the HARQ-ACKs of the subframes of the secondary serving cell that are fed back in at least one of the subframe 2 or the subframe 7 of the primary serving cell; or when the uplink-downlink configuration of the primary serving cell is the uplink-downlink configuration 6, at least one is subtracted from the subframes of the secondary serving cell corresponding to the HARQ-ACKs of the subframes of the secondary serving cell that are fed back in at least one of the subframe 2, the subframe 3, the subframe 4, the subframe 7, or the subframe 8 of the primary serving cell.

With reference to any one of the first to the eighth possible implementation manners of the sixth aspect, in a tenth possible implementation manner of the sixth aspect, when an uplink-downlink configuration of the secondary serving cell is an uplink-downlink configuration 5, the uplink-downlink configuration of the primary serving cell meets at least one of the following conditions:

when the uplink-downlink configuration of the primary serving cell is the uplink-downlink configuration 0, one is subtracted from the subframes of the secondary serving cell corresponding to the HARQ-ACKs of the subframes of the secondary serving cell that are fed back in at least one of the subframe 2, the subframe 3, the subframe 4, the subframe 7, the subframe 8, or the subframe 9 of the primary serving cell;

when the uplink-downlink configuration of the primary serving cell is the uplink-downlink configuration 1, one is subtracted from the subframes of the secondary serving cell corresponding to the HARQ-ACKs of the subframes of the secondary serving cell that are fed back in at least one of the subframe 2, the subframe 3, the subframe 7, or the subframe 8 of the primary serving cell;

when the uplink-downlink configuration of the primary serving cell is the uplink-downlink configuration 2, one is subtracted from the subframes of the secondary serving cell corresponding to the HARQ-ACKs of the subframes of the secondary serving cell that are fed back in at least one of the subframe 2 or the subframe 7 of the primary serving cell; or when the uplink-downlink configuration of the primary serving cell is the uplink-downlink configuration 6, one is subtracted from the subframes of the secondary serving cell corresponding to the HARQ-ACKs of the subframes of the secondary serving cell that are fed back in at least one of the subframe 2, the subframe 3, the subframe 4, the subframe 7, or the subframe 8 of the primary serving cell.

In the embodiments of the present disclosure, an HARQ time sequence relationship in carrier aggregation is redefined to limit an uplink-downlink configuration of a primary serving cell to any one of the foregoing uplink-downlink configurations, so that multiple carriers can be configured for carrier aggregation that meets the foregoing limitation condition in some TDD uplink-downlink configurations. For example, when a configuration of a secondary serving cell is an uplink-downlink configuration 5, a mode of a PUCCH format 3 may support CA of more than two secondary serving cells in the uplink-downlink configuration 5, and HARQ-ACKs that need to be fed back can be dispersed in multiple different uplink subframes for feedback according to the foregoing HARQ time sequence relationship in the carrier aggregation. Therefore, a feedback delay is shortened, and feedback performance is improved.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
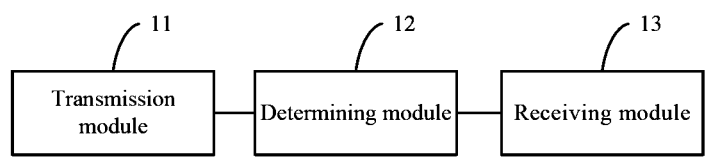
FIG. 1 is a schematic structural diagram of Embodiment 1 of an apparatus for transmitting acknowledgement information according to the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In an LTE TDD system, reception and transmission are completed at different time in one carrier, that is, uplink transmission and downlink transmission are distinguished by a subframe granularity in time. Subframes in the LTE TDD system include downlink subframes, uplink subframes, and special subframes. A special subframe includes a downlink pilot timeslot (DwPTS), a guard period (GP), and an uplink pilot timeslot (UpPTS). The GP is mainly used to compensate for a downlink-to-uplink switching time and a propagation delay. Particularly, downlink data may be transmitted in the DwPTS of the special subframe. Therefore, sometimes, the special subframe may also be considered as a downlink subframe for processing. For example, downlink data transmitted in the DwPTS requires corresponding acknowledgement information feedback. A status of acknowledgement information includes acknowledge (ACK) or negative acknowledge (NACK).

The LTE TDD system may support seven different uplink-downlink configurations. Specific configurations are shown in Table 1. In Table 1, D represents a downlink subframe, S represents a special subframe, and U represents an uplink subframe. A downlink-uplink switch-point periodicity of uplink-downlink configurations 0, 1, 2, and 6 is 5 milliseconds (ms), and a downlink-uplink switch-point periodicity of uplink-downlink configurations 3, 4, and 5 is 10 ms.

TABLE 1

Different uplink-downlink configurations in the LTE TDD system

| Uplink-downlink configuration | Downlink-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In addition, TDD CA includes CA of same uplink-downlink configurations, for example, CA of two uplink-downlink configurations 1, and CA of different uplink-downlink configurations, for example, CA of uplink-downlink configurations 1 and 2. CA includes a primary serving cell and at least one secondary serving cell, and a PUCCH carrying an HARQ-ACK is transmitted only in the primary serving cell. Transmission modes of the PUCCH in CA include two modes: a channel selection mode and a PUCCH format 3.

For CA of same uplink-downlink configurations, a hybrid automatic repeat request acknowledgement (HARQ-ACK) information time sequence relationship is the same as a TDD time sequence relationship of a single carrier. For CA of different uplink-downlink configurations, an HARQ-ACK time sequence relationship of the primary serving cell complies with an HARQ-ACK time sequence relationship of an uplink-downlink configuration of the primary serving cell itself, but an HARQ-ACK time sequence relationship of the secondary serving cell complies with an HARQ-ACK time sequence relationship of a reference uplink-downlink configuration. The reference uplink-downlink configuration may be the uplink-downlink configuration of the primary serving cell, or may be an uplink-downlink configuration of the secondary serving cell itself, or may be different from the uplink-downlink configurations of the primary serving cell and the secondary serving cell. A specific reference uplink-downlink configuration is determined by a combination of the uplink-downlink configurations of the primary-secondary serving cell pair, as shown in Table 2.

TABLE 2

HARQ-ACK time sequence relationship of a secondary serving cell based on a primary-secondary serving cell pair

| Set | (Uplink-downlink configuration of the primary serving cell, uplink-downlink configuration of the secondary serving cell) | HARQ-ACK time sequence relationship of the secondary serving cell Reference uplink-downlink configuration |
|---|---|---|
| Set 1 | (0, 0) | 0 |
| | (1, 0), (1, 1), (1, 6) | 1 |
| | (2, 0), (2, 2), (2, 1), (2, 6) | 2 |
| | (3, 0), (3, 3), (3, 6) | 3 |
| | (4, 0), (4, 1), (4, 3), (4, 4), (4, 6) | 4 |
| | (5, 0), (5, 1), (5, 2), (5, 3), (5, 4), (5, 5), (5, 6) | 5 |
| | (6, 0), (6, 6) | 6 |
| Set 2 | (0, 1), (6, 1) | 1 |
| | (0, 2), (1, 2), (6, 2) | 2 |
| | (0, 3), (6, 3) | 3 |
| | (0, 4), (1, 4), (3, 4), (6, 4) | 4 |
| | (0, 5), (1, 5), (2, 5), (3, 5), (4, 5), (6, 5) | 5 |
| | (0, 6) | 6 |
| Set 3 | (3, 1), (1, 3) | 4 |
| | (3, 2), (4, 2), (2, 3), (2, 4) | 5 |

Herein an example is used to describe a problem that a maximum quantity of carriers for CA in the uplink-downlink configuration 5 is limited to two. A CA combination (2, 5) is used as an example in the following description.

TABLE 3

Problem that a quantity of carriers for CA in the configuration 2 of the primary serving cell and the configuration 5 of the secondary serving cell is limited

| Uplink-downlink configuration of the serving cells | Subframe number (n) | | | | | | | | | |
|---|---|---|---|---|---|---|---|---|---|---|
| | 0 | 1 | 2 | 3 | 4 | 5 | 6 | 7 | 8 | 9 |
| 2 (primary serving cell) | — | — | 8, 7, 6, 4 | — | — | — | — | 8, 7, 6, 4 | — | — |
| 5 (secondary serving cell) | — | — | 13, 12, 9, 8, 7, 5, 4, 11, 6 | — | — | — | — | — | — | — |

It is assumed that the primary serving cell is the uplink-downlink configuration 2, and that the secondary serving cell is the uplink-downlink configuration 5. As shown in Table 3, when only one secondary serving cell exists, it may be determined, according to Table 2, that the reference uplink-downlink configuration of the secondary serving cell is the uplink-downlink configuration 5 of the secondary serving cell itself. Specific data scheduling and HARQ-ACK feedback procedures are as follows: Assuming that a physical downlink shared channel (PDSCH) is scheduled in a subframe 8 of the secondary serving cell, an HARQ-ACK corresponding to the PDSCH needs to be fed back in a subframe 2 of a next radio frame. The specific HARQ time sequence relationship may be learned from a quantity 4 of numbers in a number set included in the uplink subframe 2 in Table 3. That is, when the subframe 2 is an HARQ-ACK feedback subframe, a subframe carrying the PDSCH and corresponding to the HARQ-ACK fed back in the subframe is n−4, namely, a subframe 8 of a previous radio frame. In the subframe, a total quantity of numbers in the number set corresponding to the secondary serving cell is 9. All HARQ-ACKs corresponding to PDSCHs transmitted in all the nine downlink subframes in the secondary serving cell need to be fed back in the uplink subframe. The total quantity is defined as an M value. In this case, the M value is equal to 9.

Because the channel selection mode supports a maximum M value of 4, the channel selection mode does not support the uplink-downlink configuration 5, and a mode of the PUCCH format 3 is used as a transmission mode of the PUCCH in CA. However, a maximum HARQ-ACK size supported in the mode of the PUCCH format 3 is 20 bits. If the primary serving cell is the uplink-downlink configuration 2, when both of two secondary serving cells are the uplink-downlink configuration 5, a sum of M values of all cells in the subframe 2 is 4+9+9=22, and the sum is greater than 20. Therefore, the mode of the PUCCH format 3 cannot support CA of more than two secondary serving cells in the uplink-downlink configuration 5. In addition, if a secondary serving cell is the uplink-downlink configuration 5, a feedback delay of an HARQ-ACK of the secondary serving cell is very long, for example, a longest time sequence of n−13, namely, a delay of 13 subframes. Moreover, because the M value is 9, HARQ-ACK performance is degraded. Particularly, a sequence of numbers in the number set included in the uplink subframe 2 is not limited, that is, the sequence may be any sequence, provided that the corresponding quantity of PDSCH subframes and subframe numbers are consistent. This is applicable to other TDD uplink-downlink configurations and other uplink subframes for feeding back HARQ-ACKs in the other TDD uplink-downlink configurations, that is, the PDSCH subframe sequence problem is not considered.

In the future, an important scenario of network deployment is: a primary serving cell is on a macro base station, and a TDD configuration is an uplink-downlink configuration with more uplink subframes to ensure feedback performance and a feedback delay, for example, the uplink-downlink configuration 1 or 2; a secondary serving cell is on a micro base station or a pico base station, and a TDD configuration is an uplink-downlink configuration with more downlink subframes to ensure transmission at a high data rate, that is, a downlink service of the macro base station is offloaded to the micro base station, for example, the uplink-downlink configuration 5 is configured. Considering that the CA combinations (0/1/2, 5) are extensively deployed and configured, and considering problems of the foregoing carrier quantity limitation, feedback delay, and feedback performance, a new solution is required for overcoming, so that more carriers can be configured in some TDD uplink-downlink configurations, and the feedback delay is shortened, and feedback performance is improved.

Based on the foregoing problems, the embodiments of the present disclosure provide a method, an apparatus, and a device for transmitting acknowledgement information. The method, apparatus, and device are applied to an LTE TDD system, and may be used on a base station side and a UE side respectively. Specifically, detailed descriptions are provided hereinafter.

FIG. 1 is a schematic structural diagram of Embodiment 1 of an apparatus for transmitting acknowledgement information according to the present disclosure. This embodiment of the present disclosure provides an apparatus for transmitting acknowledgement information, applied to a TDD system, where the apparatus may be integrated in a device, for example, a base station. As shown in FIG. 1, the apparatus includes a transmission module 11, a determining module 12, and a receiving module 13.

The determining module 12 is configured to determine to transmit, in a secondary serving cell, a PDSCH to UE. The transmission module 11 is configured to transmit, in the secondary serving cell, the PDSCH determined by the determining module 12 to the UE. The determining module 12 is further configured to determine an HARQ time sequence relationship corresponding to the secondary serving cell, where the HARQ time sequence relationship is an HARQ time sequence relationship between the PDSCH and an HARQ-ACK. The receiving module 13 is configured to receive, in a primary serving cell according to the HARQ time sequence relationship determined by the determining module 12, the HARQ-ACK corresponding to the PDSCH. In this embodiment, the primary serving cell is a TDD primary serving cell configured by a base station for the UE, the secondary serving cell is a secondary serving cell in N TDD secondary serving cells configured by the base station for the UE, and N is a natural number that is greater than or equal to 1.

Figure 4:
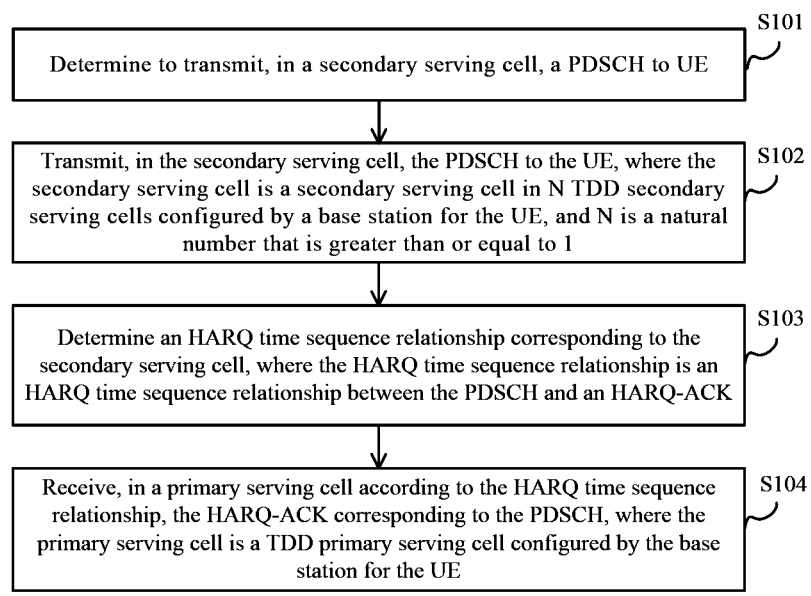
FIG. 4 is a schematic flowchart of Embodiment 1 of a method for transmitting acknowledgement information according to the present disclosure.

The apparatus of this embodiment of the present disclosure may be configured to execute the technical solution of the method embodiment shown in FIG. 4. Implementation principles and technical effects thereof are similar, and are not described herein.

In the foregoing embodiment, the HARQ time sequence relationship includes: an uplink-downlink configuration of the primary serving cell is any one of an uplink-downlink configuration 0, an uplink-downlink configuration 1, an uplink-downlink configuration 2, or an uplink-downlink configuration 6.

When the uplink-downlink configuration of the primary serving cell is the uplink-downlink configuration 0, uplink subframes of the primary serving cell include a subframe 2, a subframe 3, a subframe 4, a subframe 7, a subframe 8, and a subframe 9, where an HARQ-ACK of a subframe of the secondary serving cell corresponding to a subframe that is forward offset by five subframes and/or forward offset by six subframes from the corresponding subframe 2 is fed back in the subframe 2 of the primary serving cell, an HARQ-ACK of a subframe of the secondary serving cell corresponding to a subframe that is forward offset by four subframes and/or forward offset by five subframes from the corresponding subframe 3 is fed back in the subframe 3 of the primary serving cell, an HARQ-ACK of a subframe of the secondary serving cell corresponding to a subframe that is forward offset by four subframes from the corresponding subframe 4 is fed back in the subframe 4 of the primary serving cell, an HARQ-ACK of a subframe of the secondary serving cell corresponding to a subframe that is forward offset by six subframes and/or forward offset by five subframes from the corresponding subframe 7 is fed back in the subframe 7 of the primary serving cell, an HARQ-ACK of a subframe of the secondary serving cell corresponding to a subframe that is forward offset by five subframes and/or forward offset by four subframes from the corresponding subframe 8 is fed back in the subframe 8 of the primary serving cell, and an HARQ-ACK of a subframe of the secondary serving cell corresponding to a subframe that is forward offset by four subframes from the corresponding subframe 9 is fed back in the subframe 9 of the primary serving cell.

When the uplink-downlink configuration of the primary serving cell is the uplink-downlink configuration 1, uplink subframes of the primary serving cell include a subframe 2, a subframe 3, a subframe 7, and a subframe 8, where an HARQ-ACK of a subframe of the secondary serving cell corresponding to a subframe that is forward offset by seven subframes and/or forward offset by six subframes from the corresponding subframe 2 is fed back in the subframe 2 of the primary serving cell, an HARQ-ACK of at least one subframe of the secondary serving cell corresponding to subframes that are forward offset by six subframes, forward offset by five subframes, and forward offset by four subframes from the corresponding subframe 3 is fed back in the subframe 3 of the primary serving cell, an HARQ-ACK of a subframe of the secondary serving cell corresponding to a subframe that is forward offset by seven subframes and/or forward offset by six subframes from the corresponding subframe 7 is fed back in the subframe 7 of the primary serving cell, and an HARQ-ACK of at least one subframe of the secondary serving cell corresponding to subframes that are forward offset by six subframes, forward offset by five subframes, and forward offset by four subframes from the corresponding subframe 8 is fed back in the subframe 8 of the primary serving cell.

When the uplink-downlink configuration of the primary serving cell is the uplink-downlink configuration 2, uplink subframes of the primary serving cell include a subframe 2 and a subframe 7, where an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 2 is fed back in the subframe 2 of the primary serving cell, and an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 7 is fed back in the subframe 7 of the primary serving cell.

When the uplink-downlink configuration of the primary serving cell is the uplink-downlink configuration 6, uplink subframes of the primary serving cell include a subframe 2, a subframe 3, a subframe 4, a subframe 7, and a subframe 8, where an HARQ-ACK of a subframe of the secondary serving cell corresponding to a subframe that is forward offset by eight subframes and/or forward offset by seven subframes from the corresponding subframe 2 is fed back in the subframe 2 of the primary serving cell, an HARQ-ACK of a subframe of the secondary serving cell corresponding to a subframe that is forward offset by seven subframes and/or forward offset by six subframes from the corresponding subframe 3 is fed back in the subframe 3 of the primary serving cell, an HARQ-ACK of a subframe of the secondary serving cell corresponding to a subframe that is forward offset by six subframes and/or forward offset by five subframes from the corresponding subframe 4 is fed back in the subframe 4 of the primary serving cell, an HARQ-ACK of a subframe of the secondary serving cell corresponding to a subframe that is forward offset by seven subframes from the corresponding subframe 7 is fed back in the subframe 7 of the primary serving cell, and an HARQ-ACK of at least one subframe of the secondary serving cell corresponding to subframes that are forward offset by seven subframes, forward offset by six subframes, and forward offset by five subframes from the corresponding subframe 8 is fed back in the subframe 8 of the primary serving cell.

In this embodiment of the present disclosure, an HARQ time sequence relationship in carrier aggregation is redefined to limit an uplink-downlink configuration of a primary serving cell to any one of the foregoing uplink-downlink configurations, so that multiple carriers can be configured for carrier aggregation that meets the foregoing limitation condition in some TDD uplink-downlink configurations. For example, when a configuration of a secondary serving cell is an uplink-downlink configuration 5, a mode of a PUCCH format 3 may support CA of more than two secondary serving cells in the uplink-downlink configuration 5, and HARQ-ACKs that need to be fed back can be dispersed in multiple different uplink subframes for feedback according to the foregoing HARQ time sequence relationship in the carrier aggregation. Therefore, a feedback delay is shortened, and feedback performance is improved.

It should be noted that, the uplink subframes of the primary serving cell include uplink subframes that are not uplink subframes of the secondary serving cell.

On a basis of the foregoing embodiment, when the primary serving cell has different uplink-downlink configurations, quantities of subframes of the secondary serving cell corresponding to the HARQ-ACKs of the subframes of the secondary serving cell that can be fed back in different subframes of the primary serving cell are different. The following cases exist:

when the uplink-downlink configuration of the primary serving cell is the uplink-downlink configuration 0, a quantity of the subframes of the secondary serving cell corresponding to the HARQ-ACKs of the subframes of the secondary serving cell that can be fed back in the subframe 2, the subframe 3, the subframe 7, or the subframe 8 of the primary serving cell is 2, and a quantity of the subframes of the secondary serving cell corresponding to the HARQ-ACKs of the subframes of the secondary serving cell that can be fed back in the subframe 4 or the subframe 9 of the primary serving cell is 1;

when the uplink-downlink configuration of the primary serving cell is the uplink-downlink configuration 1, a quantity of the subframes of the secondary serving cell corresponding to the HARQ-ACKs of the subframes of the secondary serving cell that can be fed back in the subframe 2 or the subframe 7 of the primary serving cell is 2, and a quantity of the subframes of the secondary serving cell corresponding to the HARQ-ACKs of the subframes of the secondary serving cell that can be fed back in the subframe 3 or the subframe 8 of the primary serving cell is 3;

when the uplink-downlink configuration of the primary serving cell is the uplink-downlink configuration 2, a quantity of the subframes of the secondary serving cell corresponding to the HARQ-ACKs of the subframes of the secondary serving cell that can be fed back in the subframe 2 or the subframe 7 of the primary serving cell is 5; or when the uplink-downlink configuration of the primary serving cell is the uplink-downlink configuration 6, a quantity of the subframes of the secondary serving cell corresponding to the HARQ-ACKs of the subframes of the secondary serving cell that can be fed back in the subframe 2, the subframe 3, or the subframe 4 of the primary serving cell is 2, a quantity of the subframes of the secondary serving cell corresponding to the HARQ-ACKs of the subframes of the secondary serving cell that can be fed back in the subframe 7 of the primary serving cell is 1, and a quantity of the subframes of the secondary serving cell corresponding to the HARQ-ACKs of the subframes of the secondary serving cell that can be fed back in the subframe 8 of the primary serving cell is 3.

In the foregoing embodiment of the present disclosure, based on different transmission modes, the UE may be full-duplex UE or may be half-duplex UE. For UE in different transmission modes, specific functions of the receiving module 13 are different. The following uses an example for description.

In an implementation manner, the UE is full-duplex UE, and the receiving module 13 may be specifically configured to: determine an M value according to a subframe in which the HARQ-ACK corresponding to the PDSCH is received, where the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell; determine an HARQ-ACK feedback table in a channel selection mode according to the M value; and receive, in the primary serving cell according to the HARQ-ACK feedback table, the HARQ-ACK corresponding to the PDSCH.

In another implementation manner, the UE is full-duplex UE, and the receiving module 13 may be specifically configured to: determine an M value according to a subframe in which the HARQ-ACK corresponding to the PDSCH is received, where the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell; determine an HARQ-ACK codebook size in a mode of a physical uplink control channel format 3 according to the M value; and receive, in the primary serving cell according to the HARQ-ACK codebook size, the HARQ-ACK corresponding to the PDSCH.

In still another implementation manner, the UE is half-duplex UE, and the receiving module 13 is specifically configured to: determine an M value according to a subframe in which the HARQ-ACK corresponding to the PDSCH is received, where the M value is a numeric value obtained after a quantity of uplink subframes in the subframes of the secondary serving cell and a quantity of downlink subframes in the subframes of the secondary serving cell are subtracted from the quantity of the subframes of the secondary serving cell corresponding to the HARQ-ACKs of the subframes of the secondary serving cell that can be fed back in the subframe of the primary serving cell, where a subframe at a same time as the downlink subframe is an uplink subframe or a special subframe in the primary serving cell; determine an HARQ-ACK feedback table in a channel selection mode according to the M value; and receive, in the primary serving cell according to the HARQ-ACK feedback table, the HARQ-ACK corresponding to the PDSCH.

In yet another implementation manner, the UE is half-duplex UE, and the receiving module 13 may be specifically configured to: determine an M value according to a subframe in which the HARQ-ACK corresponding to the PDSCH is received, where the M value is a numeric value obtained after a quantity of uplink subframes in the subframes of the secondary serving cell and a quantity of downlink subframes in the subframes of the secondary serving cell are subtracted from the quantity of the subframes of the secondary serving cell corresponding to the HARQ-ACKs of the subframes of the secondary serving cell that can be fed back in the subframe of the primary serving cell, where a subframe at a same time as the downlink subframe is an uplink subframe or a special subframe in the primary serving cell; determine an HARQ-ACK codebook size in a mode of a physical uplink control channel format 3 according to the M value; and receive, in the primary serving cell according to the HARQ-ACK codebook size, the HARQ-ACK corresponding to the PDSCH.

For detailed descriptions of the foregoing implementation manners, refer to a detailed description of the method embodiment shown in FIG. 4. Details are not described herein.

Further, the receiving module 13 may be further configured to: before the transmission module 11 transmits, in the secondary serving cell, the PDSCH determined by the determining module 12 to the UE, receive capability information reported by the UE, where the capability information is used to indicate whether the UE supports the HARQ time sequence relationship. In this embodiment, the determining module 12 may be further configured to determine, according to the capability information, that the UE supports the HARQ time sequence relationship.

In the foregoing embodiment, the uplink-downlink configuration of the primary serving cell meets at least one of the following conditions:

In a scenario, when the uplink-downlink configuration of the primary serving cell is the uplink-downlink configuration 0, at least one is subtracted from the subframes of the secondary serving cell corresponding to the HARQ-ACKs of the subframes of the secondary serving cell that are fed back in at least one of the subframe 2, the subframe 3, the subframe 4, the subframe 7, the subframe 8, or the subframe 9 of the primary serving cell.

In another scenario, when the uplink-downlink configuration of the primary serving cell is the uplink-downlink configuration 1, at least one is subtracted from the subframes of the secondary serving cell corresponding to the HARQ-ACKs of the subframes of the secondary serving cell that are fed back in at least one of the subframe 2, the subframe 3, the subframe 7, or the subframe 8 of the primary serving cell.

In still another scenario, when the uplink-downlink configuration of the primary serving cell is the uplink-downlink configuration 2, at least one is subtracted from the subframes of the secondary serving cell corresponding to the HARQ-ACKs of the subframes of the secondary serving cell that are fed back in at least one of the subframe 2 or the subframe 7 of the primary serving cell.

In yet another scenario, when the uplink-downlink configuration of the primary serving cell is the uplink-downlink configuration 6, at least one is subtracted from the subframes of the secondary serving cell corresponding to the HARQ-ACKs of the subframes of the secondary serving cell that are fed back in at least one of the subframe 2, the subframe 3, the subframe 4, the subframe 7, or the subframe 8 of the primary serving cell.

Optionally, when an uplink-downlink configuration of the secondary serving cell is an uplink-downlink configuration 5, the uplink-downlink configuration of the primary serving cell meets at least one of the foregoing different scenarios.

Figure 2:
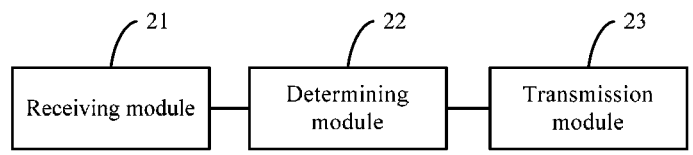
FIG. 2 is a schematic structural diagram of Embodiment 2 of an apparatus for transmitting acknowledgement information according to the present disclosure.

FIG. 2 is a schematic structural diagram of Embodiment 2 of an apparatus for transmitting acknowledgement information according to the present disclosure. This embodiment of the present disclosure provides an apparatus for transmitting acknowledgement information, applied to a TDD system, where the apparatus may be integrated in a device, for example, user equipment. As shown in FIG. 2, the apparatus includes a receiving module 21, a determining module 22, and a transmission module 23.

The receiving module 21 is configured to receive a PDSCH in a secondary serving cell. The determining module 22 is configured to determine an HARQ time sequence relationship corresponding to the secondary serving cell, where the HARQ time sequence relationship is an HARQ time sequence relationship between the PDSCH received by the receiving module 21 and an HARQ-ACK. The transmission module 23 is configured to transmit, in a primary serving cell according to the HARQ time sequence relationship determined by the determining module, the HARQ-ACK corresponding to the PDSCH. In this embodiment, the primary serving cell is a TDD primary serving cell configured by a base station for user equipment UE, the secondary serving cell is a secondary serving cell in N TDD secondary serving cells configured by the base station for the UE, and N is a natural number that is greater than or equal to 1.

This embodiment of the present disclosure is disposed in a correspondence to the apparatus embodiment shown in FIG. 1. The disposition in a correspondence means that for same information, for example, the PDSCH or the HARQ-ACK corresponding to the PDSCH, two apparatuses are so disposed that one is used as a transmit end and that the other is used as a receive end.

Figure 5:
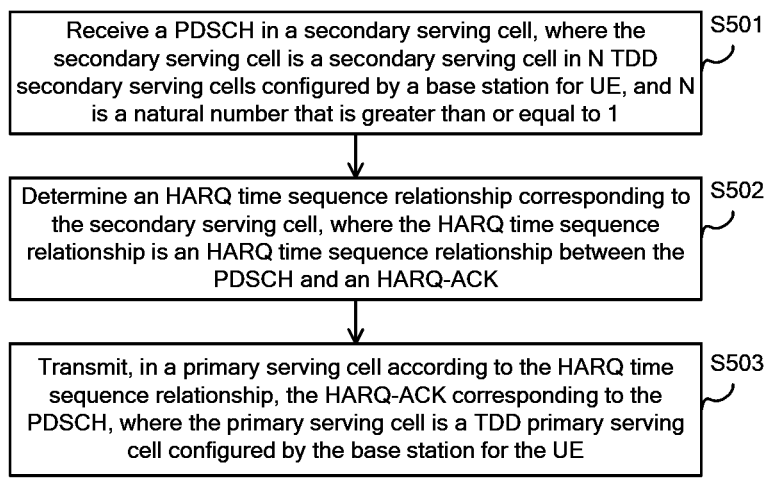
FIG. 5 is a schematic flowchart of Embodiment 2 of a method for transmitting acknowledgement information according to the present disclosure.

The apparatus of this embodiment of the present disclosure may be configured to execute the technical solution of the method embodiment shown in FIG. 5. Implementation principles and technical effects thereof are similar, and are not described herein.

The HARQ time sequence relationship may include: an uplink-downlink configuration of the primary serving cell is any one of an uplink-downlink configuration 0, an uplink-downlink configuration 1, an uplink-downlink configuration 2, or an uplink-downlink configuration 6.

Specifically, when the uplink-downlink configuration of the primary serving cell is the uplink-downlink configuration 0, uplink subframes of the primary serving cell include a subframe 2, a subframe 3, a subframe 4, a subframe 7, a subframe 8, and a subframe 9, where an HARQ-ACK of a subframe of the secondary serving cell corresponding to a subframe that is forward offset by five subframes and/or forward offset by six subframes from the corresponding subframe 2 is fed back in the subframe 2 of the primary serving cell, an HARQ-ACK of a subframe of the secondary serving cell corresponding to a subframe that is forward offset by four subframes and/or forward offset by five subframes from the corresponding subframe 3 is fed back in the subframe 3 of the primary serving cell, an HARQ-ACK of a subframe of the secondary serving cell corresponding to a subframe that is forward offset by four subframes from the corresponding subframe 4 is fed back in the subframe 4 of the primary serving cell, an HARQ-ACK of a subframe of the secondary serving cell corresponding to a subframe that is forward offset by six subframes and/or forward offset by five subframes from the corresponding subframe 7 is fed back in the subframe 7 of the primary serving cell, an HARQ-ACK of a subframe of the secondary serving cell corresponding to a subframe that is forward offset by five subframes and/or forward offset by four subframes from the corresponding subframe 8 is fed back in the subframe 8 of the primary serving cell, and an HARQ-ACK of a subframe of the secondary serving cell corresponding to a subframe that is forward offset by four subframes from the corresponding subframe 9 is fed back in the subframe 9 of the primary serving cell.

When the uplink-downlink configuration of the primary serving cell is the uplink-downlink configuration 1, uplink subframes of the primary serving cell include a subframe 2, a subframe 3, a subframe 7, and a subframe 8, where an HARQ-ACK of a subframe of the secondary serving cell corresponding to a subframe that is forward offset by seven subframes and/or forward offset by six subframes from the corresponding subframe 2 is fed back in the subframe 2 of the primary serving cell, an HARQ-ACK of at least one subframe of the secondary serving cell corresponding to subframes that are forward offset by six subframes, forward offset by five subframes, and forward offset by four subframes from the corresponding subframe 3 is fed back in the subframe 3 of the primary serving cell, an HARQ-ACK of a subframe of the secondary serving cell corresponding to a subframe that is forward offset by seven subframes and/or forward offset by six subframes from the corresponding subframe 7 is fed back in the subframe 7 of the primary serving cell, and an HARQ-ACK of at least one subframe of the secondary serving cell corresponding to subframes that are forward offset by six subframes, forward offset by five subframes, and forward offset by four subframes from the corresponding subframe 8 is fed back in the subframe 8 of the primary serving cell.

When the uplink-downlink configuration of the primary serving cell is the uplink-downlink configuration 2, uplink subframes of the primary serving cell include a subframe 2 and a subframe 7, where an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 2 is fed back in the subframe 2 of the primary serving cell, and an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 7 is fed back in the subframe 7 of the primary serving cell.

When the uplink-downlink configuration of the primary serving cell is the uplink-downlink configuration 6, uplink subframes of the primary serving cell include a subframe 2, a subframe 3, a subframe 4, a subframe 7, and a subframe 8, where an HARQ-ACK of a subframe of the secondary serving cell corresponding to a subframe that is forward offset by eight subframes and/or forward offset by seven subframes from the corresponding subframe 2 is fed back in the subframe 2 of the primary serving cell, an HARQ-ACK of a subframe of the secondary serving cell corresponding to a subframe that is forward offset by seven subframes and/or forward offset by six subframes from the corresponding subframe 3 is fed back in the subframe 3 of the primary serving cell, an HARQ-ACK of a subframe of the secondary serving cell corresponding to a subframe that is forward offset by six subframes and/or forward offset by five subframes from the corresponding subframe 4 is fed back in the subframe 4 of the primary serving cell, an HARQ-ACK of a subframe of the secondary serving cell corresponding to a subframe that is forward offset by seven subframes from the corresponding subframe 7 is fed back in the subframe 7 of the primary serving cell, and an HARQ-ACK of at least one subframe of the secondary serving cell corresponding to subframes that are forward offset by seven subframes, forward offset by six subframes, and forward offset by five subframes from the corresponding subframe 8 is fed back in the subframe 8 of the primary serving cell.

In the foregoing embodiment, the uplink subframes of the primary serving cell include uplink subframes that are not uplink subframes of the secondary serving cell.

Further, when the uplink-downlink configuration of the primary serving cell is the uplink-downlink configuration 0, a quantity of the subframes of the secondary serving cell corresponding to the HARQ-ACKs of the subframes of the secondary serving cell that can be fed back in the subframe 2, the subframe 3, the subframe 7, or the subframe 8 of the primary serving cell is 2, and a quantity of the subframes of the secondary serving cell corresponding to the HARQ-ACKs of the subframes of the secondary serving cell that can be fed back in the subframe 4 or the subframe 9 of the primary serving cell is 1.

When the uplink-downlink configuration of the primary serving cell is the uplink-downlink configuration 1, a quantity of the subframes of the secondary serving cell corresponding to the HARQ-ACKs of the subframes of the secondary serving cell that can be fed back in the subframe 2 or the subframe 7 of the primary serving cell is 2, and a quantity of the subframes of the secondary serving cell corresponding to the HARQ-ACKs of the subframes of the secondary serving cell that can be fed back in the subframe 3 or the subframe 8 of the primary serving cell is 3.

When the uplink-downlink configuration of the primary serving cell is the uplink-downlink configuration 2, a quantity of the subframes of the secondary serving cell corresponding to the HARQ-ACKs of the subframes of the secondary serving cell that can be fed back in the subframe 2 or the subframe 7 of the primary serving cell is 5.

When the uplink-downlink configuration of the primary serving cell is the uplink-downlink configuration 6, a quantity of the subframes of the secondary serving cell corresponding to the HARQ-ACKs of the subframes of the secondary serving cell that can be fed back in the subframe 2, the subframe 3, or the subframe 4 of the primary serving cell is 2, a quantity of the subframes of the secondary serving cell corresponding to the HARQ-ACKs of the subframes of the secondary serving cell that can be fed back in the subframe 7 of the primary serving cell is 1, and a quantity of the subframes of the secondary serving cell corresponding to the HARQ-ACKs of the subframes of the secondary serving cell that can be fed back in the subframe 8 of the primary serving cell is 3.

Optionally, the UE is full-duplex UE, and the transmission module 23 may be specifically configured to: determine an M value according to a subframe in which the HARQ-ACK corresponding to the PDSCH is transmitted, where the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell; determine an HARQ-ACK feedback table in a channel selection mode according to the M value; and transmit, in the primary serving cell according to the HARQ-ACK feedback table, the HARQ-ACK corresponding to the PDSCH.

Optionally, the UE is full-duplex UE, and the transmission module 23 may be specifically configured to: determine an M value according to a subframe in which the HARQ-ACK corresponding to the PDSCH is transmitted, where the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell; determine an HARQ-ACK codebook size in a mode of a physical uplink control channel format 3 according to the M value; and transmit, in the primary serving cell according to the HARQ-ACK codebook size, the HARQ-ACK corresponding to the PDSCH.

Optionally, the UE is half-duplex UE, and the transmission module 23 may be specifically configured to: determine an M value according to a subframe in which the HARQ-ACK corresponding to the PDSCH is transmitted, where the M value is a numeric value obtained after a quantity of uplink subframes in the subframes of the secondary serving cell and a quantity of downlink subframes in the subframes of the secondary serving cell are subtracted from the quantity of the subframes of the secondary serving cell corresponding to the HARQ-ACKs of the subframes of the secondary serving cell that can be fed back in the subframe of the primary serving cell, where a subframe at a same time as the downlink subframe is an uplink subframe or a special subframe in the primary serving cell, where a subframe at a same time as the downlink subframe is an uplink subframe or a special subframe in the primary serving cell; determine an HARQ-ACK feedback table in a channel selection mode according to the M value; and transmit, in the primary serving cell according to the HARQ-ACK feedback table, the HARQ-ACK corresponding to the PDSCH.

Optionally, the UE is half-duplex UE, and the transmission module 23 may be specifically configured to: determine an M value according to a subframe in which the HARQ-ACK corresponding to the PDSCH is transmitted, where the M value is a numeric value obtained after a quantity of uplink subframes in the subframes of the secondary serving cell and a quantity of downlink subframes in the subframes of the secondary serving cell are subtracted from the quantity of the subframes of the secondary serving cell corresponding to the HARQ-ACKs of the subframes of the secondary serving cell that can be fed back in the subframe of the primary serving cell, where a subframe at a same time as the downlink subframe is an uplink subframe or a special subframe in the primary serving cell; determine an HARQ-ACK codebook size in a mode of a physical uplink control channel format 3 according to the M value; and transmit, in the primary serving cell according to the HARQ-ACK codebook size, the HARQ-ACK corresponding to the PDSCH.

On a basis of the foregoing embodiment, the transmission module 23 may be further configured to: before the receiving module 21 receives the PDSCH in the secondary serving cell, report capability information to the base station, where the capability information is used to indicate whether the UE supports the HARQ time sequence relationship. The determining module 22 may be further configured to determine, according to the capability information, that the apparatus supports the HARQ time sequence relationship.

In the foregoing embodiment, the uplink-downlink configuration of the primary serving cell meets at least one of the following conditions:

Condition 1: When the uplink-downlink configuration of the primary serving cell is the uplink-downlink configuration 0, at least one is subtracted from the subframes of the secondary serving cell corresponding to the HARQ-ACKs of the subframes of the secondary serving cell that are fed back in at least one of the subframe 2, the subframe 3, the subframe 4, the subframe 7, the subframe 8, or the subframe 9 of the primary serving cell.

Condition 2: When the uplink-downlink configuration of the primary serving cell is the uplink-downlink configuration 1, at least one is subtracted from the subframes of the secondary serving cell corresponding to the HARQ-ACKs of the subframes of the secondary serving cell that are fed back in at least one of the subframe 2, the subframe 3, the subframe 7, or the subframe 8 of the primary serving cell.

When the uplink-downlink configuration of the primary serving cell is the uplink-downlink configuration 2, at least one is subtracted from the subframes of the secondary serving cell corresponding to the HARQ-ACKs of the subframes of the secondary serving cell that are fed back in at least one of the subframe 2 or the subframe 7 of the primary serving cell.

Condition 3: When the uplink-downlink configuration of the primary serving cell is the uplink-downlink configuration 6, at least one is subtracted from the subframes of the secondary serving cell corresponding to the HARQ-ACKs of the subframes of the secondary serving cell that are fed back in at least one of the subframe 2, the subframe 3, the subframe 4, the subframe 7, or the subframe 8 of the primary serving cell.

Further, when an uplink-downlink configuration of the secondary serving cell is an uplink-downlink configuration 5, the uplink-downlink configuration of the primary serving cell meets at least one of the condition 1, the condition 2, or the condition 3.

Figure 3:
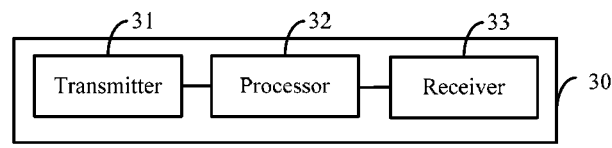
FIG. 3 is a schematic structural diagram of Embodiment 1 of a device for transmitting acknowledgement information according to the present disclosure.

FIG. 3 is a schematic structural diagram of Embodiment 1 of a device for transmitting acknowledgement information according to the present disclosure. The device is applied to a TDD system, and may be a device such as a base station. As shown in FIG. 3, the device 30 includes a transmitter 31, a processor 32, and a receiver 33.

The processor 32 is configured to determine to transmit, in a secondary serving cell, a PDSCH to UE. The transmitter 31 is configured to transmit, in the secondary serving cell, the PDSCH determined by the processor 32 to the UE. The processor 32 is further configured to determine an HARQ time sequence relationship corresponding to the secondary serving cell, where the HARQ time sequence relationship is an HARQ time sequence relationship between the PDSCH and HARQ acknowledgement HARQ-ACK information. The receiver 33 is configured to receive, in a primary serving cell according to the HARQ time sequence relationship determined by the processor 32, an HARQ-ACK corresponding to the PDSCH. The primary serving cell is a TDD primary serving cell configured by a base station for the UE, the secondary serving cell is a secondary serving cell in N TDD secondary serving cells configured by the base station for the UE, and N is a natural number that is greater than or equal to 1.

The device of this embodiment of the present disclosure may be configured to execute the technical solution of the method embodiment shown in FIG. 4. Implementation principles and technical effects thereof are similar, and are not described herein.

As shown in FIG. 3, the transmitter 31, the processor 32, and the receiver 33 may be further used for the following functions.

The receiver 33 is configured to receive a PDSCH in a secondary serving cell. The processor 32 is configured to determine an HARQ time sequence relationship corresponding to the secondary serving cell, where the HARQ time sequence relationship is an HARQ time sequence relationship between the PDSCH received by the receiver 33 and an HARQ-ACK. The transmitter 31 is configured to transmit, in a primary serving cell according to the HARQ time sequence relationship determined by the processor 32, the HARQ-ACK corresponding to the PDSCH; where the primary serving cell is a TDD primary serving cell configured by a base station for user equipment UE, the secondary serving cell is a secondary serving cell in N TDD secondary serving cells configured by the base station for the UE, and N is a natural number that is greater than or equal to 1.

The device of this embodiment of the present disclosure may be configured to execute the technical solution of the method embodiment shown in FIG. 5. Implementation principles and technical effects thereof are similar, and are not described herein.

FIG. 4 is a schematic flowchart of Embodiment 1 of a method for transmitting acknowledgement information according to the present disclosure. This embodiment of the present disclosure provides a method for transmitting acknowledgement information. The method is applied to an LTE TDD system, and may be performed by an apparatus for transmitting acknowledgement information, where the apparatus may be integrated in a device, for example, a base station. As shown in FIG. 4, the method includes:

S101. Determine to transmit, in a secondary serving cell, a PDSCH to UE.

S102. Transmit, in the secondary serving cell, the PDSCH to the UE, where the secondary serving cell is a secondary serving cell in N TDD secondary serving cells configured by a base station for the UE, and N is a natural number that is greater than or equal to 1.

S103. Determine an HARQ time sequence relationship corresponding to the secondary serving cell, where the HARQ time sequence relationship is an HARQ time sequence relationship between the PDSCH and an HARQ-ACK.

S104. Receive, in a primary serving cell according to the HARQ time sequence relationship, the HARQ-ACK corresponding to the PDSCH, where the primary serving cell is a TDD primary serving cell configured by the base station for the UE.

Specifically, after the UE accesses a network and establishes a radio resource control (RRC) connection, the base station may add or delete a serving cell for the UE, for example, add or delete a serving cell for the UE according to traffic and/or a power consumption capability of the UE or the like. When more than one serving cell is configured for the UE, the UE is served by one primary serving cell and N secondary serving cells, where N is less than or equal to 4. However, for CA in which the primary serving cell is an uplink-downlink configuration 2 and the secondary serving cell is an uplink-downlink configuration 5, a mode of a PUCCH format 3 supports a maximum of two serving cells, namely, N=1. Specifically, the base station may add or delete a secondary serving cell for the UE by using RRC signaling, or replace the primary serving cell for the UE by performing a handover procedure. This embodiment of the present disclosure is intended for TDD CA, that is, all cells serving the UE are TDD serving cells.

After the base station configures CA for the UE, the base station may transmit, in the secondary serving cell, the PDSCH to the UE, where the secondary serving cell is any one of the N secondary serving cells configured by the base station for the UE. The base station determines the HARQ time sequence relationship corresponding to the secondary serving cell, where the HARQ time sequence relationship is the HARQ time sequence relationship between the PDSCH and the HARQ-ACK. To resolve the foregoing problem of the limitation on two serving cells, the HARQ time sequence relationship is not a reference uplink-downlink configuration 5 in a current mechanism, but a new HARQ time sequence relationship is introduced. Further, the HARQ-ACK corresponding to the PDSCH is received in the primary serving cell.

Before the HARQ-ACK is transmitted by the UE or received by the base station, a PUCCH channel resource carrying the HARQ-ACK needs to be determined. For example, the PUCCH channel resource carrying the HARQ-ACK is determined according to an RRC signaling configuration, or the PUCCH channel resource carrying the HARQ-ACK is determined according to another resource implicitly corresponding to a physical downlink control channel. Further, an M value of an HARQ-ACK feedback subframe in the mode of the PUCCH format 3 needs to be determined, and a sequence of all HARQ-ACK bits in the feedback subframe and a total quantity of the bits, namely, a codebook size, are further determined. The steps may be existing mechanisms or other mechanisms, and are not limited herein. In addition, an implementation sequence of the steps is also not limited.

In this embodiment of the present disclosure, an HARQ time sequence relationship in carrier aggregation is redefined to limit an uplink-downlink configuration of a primary serving cell to any one of the foregoing uplink-downlink configurations, so that multiple carriers can be configured for carrier aggregation that meets the foregoing limitation condition in some TDD uplink-downlink configurations. For example, when a configuration of a secondary serving cell is an uplink-downlink configuration 5, a mode of a PUCCH format 3 may support CA of more than two secondary serving cells in the uplink-downlink configuration 5, and HARQ-ACKs that need to be fed back can be dispersed in multiple different uplink subframes for feedback according to the foregoing HARQ time sequence relationship in the carrier aggregation. Therefore, a feedback delay is shortened, and feedback performance is improved.

TABLE 4

HARQ time sequence relationships respectively corresponding to the secondary serving cell when the primary serving cell uses different uplink-downlink configurations

| Uplink-downlink configuration of the primary serving cell | Subframe number of the primary serving cell | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6 | 6, 5, 4 | — | — | — | 7, 6 | 6, 5, 4 | — |
| 2 | — | — | 8, 7, 6, 5, 4 | — | — | — | — | 8, 7, 6, 5, 4 | — | — |
| 6 | — | — | 8, 7 | 7, 6 | 6, 5 | — | — | 7 | 7, 6, 5 | — |

Table 4 shows the HARQ time sequence relationships respectively corresponding to the secondary serving cell when the primary serving cell uses different uplink-downlink configurations. The following describes in detail the HARQ time sequence relationship provided by this embodiment of the present disclosure.

As shown in Table 4, the HARQ time sequence relationship includes: an uplink-downlink configuration of the primary serving cell is any one of an uplink-downlink configuration 0, an uplink-downlink configuration 1, an uplink-downlink configuration 2, or an uplink-downlink configuration 6.

Specifically, when the uplink-downlink configuration of the primary serving cell is the uplink-downlink configuration 0, uplink subframes of the primary serving cell include a subframe 2, a subframe 3, a subframe 4, a subframe 7, a subframe 8, and a subframe 9, where an HARQ-ACK of a subframe of the secondary serving cell corresponding to a subframe that is forward offset by five subframes and/or forward offset by six subframes from the corresponding subframe 2 is fed back in the subframe 2 of the primary serving cell, an HARQ-ACK of a subframe of the secondary serving cell corresponding to a subframe that is forward offset by four subframes and/or forward offset by five subframes from the corresponding subframe 3 is fed back in the subframe 3 of the primary serving cell, an HARQ-ACK of a subframe of the secondary serving cell corresponding to a subframe that is forward offset by four subframes from the corresponding subframe 4 is fed back in the subframe 4 of the primary serving cell, an HARQ-ACK of a subframe of the secondary serving cell corresponding to a subframe that is forward offset by six subframes and/or forward offset by five subframes from the corresponding subframe 7 is fed back in the subframe 7 of the primary serving cell, an HARQ-ACK of a subframe of the secondary serving cell corresponding to a subframe that is forward offset by five subframes and/or forward offset by four subframes from the corresponding subframe 8 is fed back in the subframe 8 of the primary serving cell, and an HARQ-ACK of a subframe of the secondary serving cell corresponding to a subframe that is forward offset by four subframes from the corresponding subframe 9 is fed back in the subframe 9 of the primary serving cell;

when the uplink-downlink configuration of the primary serving cell is the uplink-downlink configuration 1, uplink subframes of the primary serving cell include a subframe 2, a subframe 3, a subframe 7, and a subframe 8, where an HARQ-ACK of a subframe of the secondary serving cell corresponding to a subframe that is forward offset by seven subframes and/or forward offset by six subframes from the corresponding subframe 2 is fed back in the subframe 2 of the primary serving cell, an HARQ-ACK of at least one subframe of the secondary serving cell corresponding to subframes that are forward offset by six subframes, forward offset by five subframes, and forward offset by four subframes from the corresponding subframe 3 is fed back in the subframe 3 of the primary serving cell, an HARQ-ACK of a subframe of the secondary serving cell corresponding to a subframe that is forward offset by seven subframes and/or forward offset by six subframes from the corresponding subframe 7 is fed back in the subframe 7 of the primary serving cell, and an HARQ-ACK of at least one subframe of the secondary serving cell corresponding to subframes that are forward offset by six subframes, forward offset by five subframes, and forward offset by four subframes from the corresponding subframe 8 is fed back in the subframe 8 of the primary serving cell;

when the uplink-downlink configuration of the primary serving cell is the uplink-downlink configuration 2, uplink subframes of the primary serving cell include a subframe 2 and a subframe 7, where an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 2 is fed back in the subframe 2 of the primary serving cell, and an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 7 is fed back in the subframe 7 of the primary serving cell; or when the uplink-downlink configuration of the primary serving cell is the uplink-downlink configuration 6, uplink subframes of the primary serving cell include a subframe 2, a subframe 3, a subframe 4, a subframe 7, and a subframe 8, where an HARQ-ACK of a subframe of the secondary serving cell corresponding to a subframe that is forward offset by eight subframes and/or forward offset by seven subframes from the corresponding subframe 2 is fed back in the subframe 2 of the primary serving cell, an HARQ-ACK of a subframe of the secondary serving cell corresponding to a subframe that is forward offset by seven subframes and/or forward offset by six subframes from the corresponding subframe 3 is fed back in the subframe 3 of the primary serving cell, an HARQ-ACK of a subframe of the secondary serving cell corresponding to a subframe that is forward offset by six subframes and/or forward offset by five subframes from the corresponding subframe 4 is fed back in the subframe 4 of the primary serving cell, an HARQ-ACK of a subframe of the secondary serving cell corresponding to a subframe that is forward offset by seven subframes from the corresponding subframe 7 is fed back in the subframe 7 of the primary serving cell, and an HARQ-ACK of at least one subframe of the secondary serving cell corresponding to subframes that are forward offset by seven subframes, forward offset by six subframes, and forward offset by five subframes from the corresponding subframe 8 is fed back in the subframe 8 of the primary serving cell.

The solution of this embodiment of the present disclosure considers only that TDD uplink-downlink configurations of the primary serving cell are several limited configurations in the seven uplink-downlink configurations shown in Table 1, for example, any one of the uplink-downlink configuration 0, the uplink-downlink configuration 1, the uplink-downlink configuration 2, or the uplink-downlink configuration 6 shown in Table 4, namely, an uplink-downlink configuration in which a downlink-uplink switch-point periodicity is a length of five subframes. The secondary serving cell may be any one of the seven uplink-downlink configurations shown in Table 1, and is not limited herein. However, a primary-secondary cell combination is limited. Specifically, this embodiment of the present disclosure considers a limitation on a combination scenario. The uplink subframes of the primary serving cell include uplink subframes that are not uplink subframes of the secondary serving cell, that is, the uplink subframes of the primary serving cell are not included in the uplink subframes of the secondary serving cell. The limitation may be classified into two cases.

A first case is that the uplink subframes of the primary serving cell include the uplink subframes of the secondary serving cell. For example, a primary-secondary serving cell combination is (1, 2), (2, 5), (0, 5), (1, 5), or the like.

A second case is that an uplink subframe set of the primary serving cell and an uplink subframe set of the secondary serving cell do not completely include each other. For example, a primary-secondary serving cell combination is (2, 4), (2, 3), or the like.

Referring to both Table 1 and Table 4, for example, when the uplink-downlink configuration of the primary serving cell is the uplink-downlink configuration 0, the subframe 2, the subframe 3, the subframe 4, the subframe 7, the subframe 8, and the subframe 9 are all uplink subframes, and there are six uplink subframes in total; when the uplink-downlink configuration of the primary serving cell is the uplink-downlink configuration 1, the subframe 2, the subframe 3, the subframe 7, and the subframe 8 are all uplink subframes, and there are four uplink subframes in total. A similar case exists in other uplink-downlink configurations. Therefore, feedback performance and delay are ensured.

In any embodiment of the present disclosure, when the uplink-downlink configuration of the primary serving cell is the uplink-downlink configuration 0, a quantity of the subframes of the secondary serving cell corresponding to the HARQ-ACKs of the subframes of the secondary serving cell that can be fed back in the subframe 2, the subframe 3, the subframe 7, or the subframe 8 of the primary serving cell is 2, and a quantity of the subframes of the secondary serving cell corresponding to the HARQ-ACKs of the subframes of the secondary serving cell that can be fed back in the subframe 4 or the subframe 9 of the primary serving cell is 1; when the uplink-downlink configuration of the primary serving cell is the uplink-downlink configuration 1, a quantity of the subframes of the secondary serving cell corresponding to the HARQ-ACKs of the subframes of the secondary serving cell that can be fed back in the subframe 2 or the subframe 7 of the primary serving cell is 2, and a quantity of the subframes of the secondary serving cell corresponding to the HARQ-ACKs of the subframes of the secondary serving cell that can be fed back in the subframe 3 or the subframe 8 of the primary serving cell is 3; when the uplink-downlink configuration of the primary serving cell is the uplink-downlink configuration 2, a quantity of the subframes of the secondary serving cell corresponding to the HARQ-ACKs of the subframes of the secondary serving cell that can be fed back in the subframe 2 or the subframe 7 of the primary serving cell is 5; or when the uplink-downlink configuration of the primary serving cell is the uplink-downlink configuration 6, a quantity of the subframes of the secondary serving cell corresponding to the HARQ-ACKs of the subframes of the secondary serving cell that can be fed back in the subframe 2, the subframe 3, or the subframe 4 of the primary serving cell is 2, a quantity of the subframes of the secondary serving cell corresponding to the HARQ-ACKs of the subframes of the secondary serving cell that can be fed back in the subframe 7 of the primary serving cell is 1, and a quantity of the subframes of the secondary serving cell corresponding to the HARQ-ACKs of the subframes of the secondary serving cell that can be fed back in the subframe 8 of the primary serving cell is 3.

In Table 4, the subframes in the subframe numbers of the primary serving cell are uplink subframes used to feed back HARQ-ACKs of the subframes of the secondary serving cell. Each number in a column corresponding to each uplink subframe indicates that an HARQ-ACK corresponding to a PDSCH in a downlink subframe n−k (k belongs to K) of the secondary serving cell needs to be fed back in a current uplink subframe n. For example, for a primary serving cell whose uplink-downlink configuration is the uplink-downlink configuration 1, K={7, 6} in a subframe n=2 of the primary serving cell indicates that the uplink subframe n=2 is used to feed back HARQ-ACKs corresponding to a PDSCH in two downlink subframes n−7 and/or n−6 of the secondary serving cell. Specifically, counting forward by using a subframe time of the current subframe n=2 of the primary serving cell as a reference, the subframe n−7 is a seventh subframe, namely, a subframe 5 of a previous radio frame; likewise, n−6 corresponds to a subframe 6.

In this embodiment of the present disclosure, an HARQ time sequence relationship in carrier aggregation is redefined to limit an uplink-downlink configuration of a primary serving cell to any one of the foregoing uplink-downlink configurations, so that multiple carriers can be configured for carrier aggregation that meets the foregoing limitation condition in some TDD uplink-downlink configurations. For example, when a configuration of a secondary serving cell is an uplink-downlink configuration 5, a mode of a PUCCH format 3 may support CA of more than two secondary serving cells in the uplink-downlink configuration 5, and HARQ-ACKs that need to be fed back can be dispersed in multiple different uplink subframes for feedback according to the foregoing HARQ time sequence relationship in the carrier aggregation. Therefore, a feedback delay is shortened, and feedback performance is improved.

Next, examples in which a primary-secondary serving cell combination is (2, 5) and a primary-secondary serving cell combination is (1, 2) are respectively used for detailed descriptions. Based on different transmission modes, the UE includes full-duplex UE and half-duplex UE.

1. For a scenario in which a primary-secondary serving cell combination is (2, 5), or the primary serving cell is the uplink-downlink configuration 2, and multiple secondary serving cells are the uplink-downlink configuration 5

In an actual application scenario, the UE is full-duplex UE, that is, the UE supports simultaneous reception and transmission in two serving cells. For example, assuming that the primary serving cell is an uplink subframe and that the secondary serving cell is a downlink subframe, the full-duplex UE can transmit information in the primary serving cell and receive information in the secondary serving cell simultaneously.

S104 may include: determining an M value according to a subframe in which the HARQ-ACK corresponding to the PDSCH is received, where the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell; determining an HARQ-ACK feedback table in a channel selection mode according to the M value; and receiving, in the primary serving cell according to the HARQ-ACK feedback table, the HARQ-ACK corresponding to the PDSCH.

Specifically, as shown in Table 4, the subframe 2 and the subframe 7 of the primary serving cell in the uplink-downlink configuration 2 are subframes in which the HARQ-ACKs of the subframes of the secondary serving cell are fed back. The UE needs to determine the M values of the subframes respectively. Assuming that the subframe is the subframe 2, the subframe 2 can feed back a total of five subframes in a number set {8, 7, 6, 5, 4} included in the subframes of the secondary serving cell corresponding to the HARQ-ACKs of the subframes of the secondary serving cell. In the number set, all subframes that can be fed back and correspond to the subframes of the secondary serving cell in the uplink-downlink configuration 5 are downlink subframes or special subframes, specifically, subframes 4, 5, 6, 7, and 8 of the secondary serving cell. Therefore, no deduction is required, that is, the M value is 5.

Assuming that the subframe is the subframe 7, likewise, the subframe 7 can feed back a total of five subframes in a number set {8, 7, 6, 5, 4} included in the subframes of the secondary serving cell corresponding to the HARQ-ACKs of the subframes of the secondary serving cell. In the number set, a quantity of subframes that can be fed back and correspond to the uplink subframes of the secondary serving cell in the uplink-downlink configuration 5 is 1. Specifically, the uplink subframe corresponds to a total of five subframes in the number set {8, 7, 6, 5, 4}. The uplink subframe corresponding to the number 5 in the number set is an uplink subframe 2 of the secondary serving cell, and an M value of the uplink subframe 7 is 5−1=4. It should be noted that, herein a sequence of numbers in the number set is not limited.

After the M value is determined, the base station and the UE may determine, according to the M value, the HARQ-ACK feedback table in the channel selection mode; and further receive, in the primary serving cell according to the HARQ-ACK feedback table, the HARQ-ACK corresponding to the PDSCH. In addition, it should be noted that, because the M value in this example may be equal to 5, when the UE is full-duplex UE, a PUCCH transmission mode of the primary-secondary serving cell combination (2, 5) does not support the channel selection mode.

The foregoing HARQ-ACK feedback table is preset. Then a corresponding table is selected according to the M value, for example, M is equal to 2, 3, or 4. When M is equal to 2, the HARQ-ACK feedback table is shown in Table 5. When M is equal to 3, the HARQ-ACK feedback table is shown in Table 6. When M is equal to 4, the HARQ-ACK feedback table is shown in Table 7. In Table 5, Table 6, and Table 7, starting from a leftmost position of each table, a first column indicates a status of an HARQ-ACK, that is, an ACK or a NACK; a second column is a selected channel for transmitting the HARQ-ACK; a third column indicates a status of a modulation symbol for transmitting the HARQ-ACK, where N/A indicates no consideration.

TABLE 5

HARQ-ACK feedback table corresponding to M = 2

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

TABLE 6

HARQ-ACK feedback table corresponding to M = 3

| HARQ-ACK(0), HARQ-ACK(1), HARQ-ACK(2) | $n_{PUCCH}^{(1)}$ | b(0), b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | N/A | N/A |

TABLE 7

HARQ-ACK feedback table corresponding to M = 4

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In this embodiment of the present disclosure, when the full-duplex UE uses a secondary serving cell in the uplink-downlink configuration 5, a maximum of three secondary serving cells in the uplink-downlink configuration 5, that is, CA of a maximum of four serving cells, may be supported; in addition, HARQ-ACK performance and a feedback delay of the secondary serving cells are both optimized.

In another actual application scenario, the UE is full-duplex UE, and S104 may include: determining an M value according to a subframe in which the HARQ-ACK corresponding to the PDSCH is received, where the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell; determining an HARQ-ACK codebook size in a mode of a PUCCH format 3 according to the M value; and receiving, in the primary serving cell according to the HARQ-ACK codebook size, the HARQ-ACK corresponding to the PDSCH. The codebook size is a quantity of information bits of the HARQ-ACK. For example, if a transport block of downlink data is scheduled, a 1-bit HARQ-ACK needs to be fed back; if N transport blocks of downlink data are scheduled, an N-bit HARQ-ACK needs to be fed back. A difference between this application scenario and the foregoing application scenario lies only in that the PUCCH transmission mode determined according to the determined M value is different. Details are not described again herein.

In yet another actual application scenario, the UE is half-duplex UE, that is, the UE does not support simultaneous reception and transmission in two serving cells. For example, assuming that the primary serving cell is an uplink subframe and that the secondary serving cell is a downlink subframe, the half-duplex UE cannot transmit information in the primary serving cell and receive information in the secondary serving cell simultaneously. Specifically, a principle is that the UE may use a direction of the subframes of the primary serving cell at a higher priority, that is, the UE may transmit information in the primary serving cell, but cannot receive information in the secondary serving cell simultaneously. Certainly, the base station also does not schedule downlink information in the subframe for the UE in the secondary serving cell. This is also applicable conversely. If the primary serving cell is a downlink subframe, and the secondary serving cell is an uplink subframe, the UE may receive information in the primary serving cell, but cannot transmit information in the secondary serving cell.

In this application scenario, S104 may include: determining an M value according to a subframe in which the HARQ-ACK corresponding to the PDSCH is received, where the M value is a numeric value obtained after a quantity of uplink subframes in the subframes of the secondary serving cell and a quantity of downlink subframes in the subframes of the secondary serving cell are subtracted from the quantity of the subframes of the secondary serving cell corresponding to the HARQ-ACKs of the subframes of the secondary serving cell that can be fed back in the subframe of the primary serving cell, where a subframe at a same time as the downlink subframe is an uplink subframe or a special subframe in the primary serving cell; determining an HARQ-ACK feedback table in a channel selection mode according to the M value; and receiving, in the primary serving cell according to the HARQ-ACK feedback table, the HARQ-ACK corresponding to the PDSCH.

Specifically, as shown in Table 4, the subframe 2 and the subframe 7 of the primary serving cell in the uplink-downlink configuration 2 are subframes in which the HARQ-ACKs of the subframes of the secondary serving cell are fed back. The UE needs to determine the M values of the subframes respectively. Assuming that the subframe is the subframe 2, the subframe 2 can feed back a total of five subframes in a number set {8, 7, 6, 5, 4} included in the subframes of the secondary serving cell corresponding to the HARQ-ACKs of the subframes of the secondary serving cell. In the number set, all subframes that can be fed back and correspond to the subframes of the secondary serving cell in the uplink-downlink configuration 5 are downlink subframes or special subframes, specifically, subframes 4, 5, 6, 7, and 8 of the secondary serving cell. However, a subframe of the secondary serving cell corresponding to the number 5 is a subframe 7. Considering that the subframe 7 of the primary serving cell is an uplink subframe, the half-duplex UE cannot receive the PDSCH in the subframe 7 of the secondary serving cell. In addition, a subframe of the secondary serving cell corresponding to the number 6 is a downlink subframe 6. Considering that the subframe 6 of the primary serving cell is a special subframe, the half-duplex UE also cannot receive the PDSCH in the downlink subframe 6 of the secondary serving cell. Therefore, two subframes (5 and 6) need to be subtracted, that is, the M value is 5−2=3. Optionally, only one of the foregoing subframes may be subtracted, that is, only the subframe 7 of the secondary serving cell corresponding to the number 5 may be subtracted, but the subframe 6 of the secondary serving cell corresponding to the number 6 is not subtracted, and in this case, the M value is 4; or only the subframe 6 of the secondary serving cell corresponding to the number 6 may be subtracted, but the subframe 7 of the secondary serving cell corresponding to the number 5 is not subtracted, and in this case, the M value is also 4.

Assuming that the subframe is the subframe 7, the subframe 7 can feed back a total of five subframes in a number set {8, 7, 6, 5, 4} included in the subframes of the secondary serving cell corresponding to the HARQ-ACKs of the subframes of the secondary serving cell. In the number set, a quantity of subframes that can be fed back and correspond to the uplink subframes of the secondary serving cell in the uplink-downlink configuration 5 is 1. Specifically, the uplink subframe corresponding to the number 5 in the number set is an uplink subframe 2 of the secondary serving cell, and an M value of the subframe 7 is 5−1=4. In this embodiment of the present disclosure, a sequence of numbers in the number set is not limited.

After the M value is determined, the base station and the UE may determine, according to the M value, the HARQ-ACK feedback table in the channel selection mode; and further receive, in the primary serving cell according to the HARQ-ACK feedback table, the HARQ-ACK corresponding to the PDSCH. In this embodiment of the present disclosure, because the M value is less than or equal to 4, when the UE is half-duplex UE, a PUCCH transmission mode of the primary-secondary serving cell combination (2, 5) may support the channel selection mode.

In this embodiment of the present disclosure, when the half-duplex UE uses a secondary serving cell in the uplink-downlink configuration 5, a maximum of four secondary serving cells in the uplink-downlink configuration 5, that is, CA of a maximum of five serving cells, may be supported; in addition, HARQ-ACK performance and a feedback delay of the secondary serving cells are both optimized.

In still yet another actual application scenario, the UE is half-duplex UE, and S104 may include: determining an M value according to a subframe in which the HARQ-ACK corresponding to the PDSCH is received, where the M value is a numeric value obtained after a quantity of uplink subframes in the subframes of the secondary serving cell and a quantity of downlink subframes in the subframes of the secondary serving cell are subtracted from the quantity of the subframes of the secondary serving cell corresponding to the HARQ-ACKs of the subframes of the secondary serving cell that can be fed back in the subframe of the primary serving cell, where a subframe at a same time as the downlink subframe is an uplink subframe or a special subframe in the primary serving cell; determining an HARQ-ACK codebook size in a mode of a PUCCH format 3 according to the M value; and receiving, in the primary serving cell according to the HARQ-ACK codebook size, the HARQ-ACK corresponding to the PDSCH. A difference between this application scenario and the foregoing application scenario lies only in that the PUCCH transmission mode determined according to the determined M value is different. Details are not described again herein.

2. For a scenario in which a primary-secondary serving cell combination is (1, 2), or a primary serving cell is the uplink-downlink configuration 1, and multiple secondary serving cells are the uplink-downlink configuration 2

Specifically, in Table 8, according to a current time sequence of the secondary serving cell, a reference uplink-downlink configuration of the secondary serving cell in the uplink-downlink configuration 2 in the primary-secondary serving cell combination (1, 2) is an uplink-downlink configuration 2 of the secondary serving cell itself. As shown in Table 8, it can be learned that subframes feeding back the HARQ-ACKs of the secondary serving cell are two subframes in four uplink subframes of the primary serving cell, and their M values are both 4; after a new time sequence of the secondary serving cell is used, the new time sequence in Table 8 is consistent with that of the primary-secondary cell combination (1, 2), and the methods for obtaining the M values are also consistent. In addition, after the new time sequence is used, subframes feeding back the HARQ-ACKs of the secondary serving cell are extended to all uplink subframes of the primary serving cell. Therefore, M value equalization among multiple subframes is optimized, and performance is improved due to the decrease of the M value. In addition, feedback delays of some subframes are also optimized. For example, feedback delays of the PDSCH subframe 4 and subframe 9 are shortened by four subframes.

TABLE 8

New time sequence in the configuration 1 of the primary serving cell and the configuration 2 of the secondary serving cell

| Uplink-downlink configuration of the serving cell | Subframe number n | | | | | | | | | |
|---|---|---|---|---|---|---|---|---|---|---|
| | 0 | 1 | 2 | 3 | 4 | 5 | 6 | 7 | 8 | 9 |
| 1 (primary serving cell) | — | — | 7, 6 | 4 | — | — | — | 7, 6 | 4 | — |
| 2 (current time sequence of the secondary serving cell) | — | — | 8, 7, 6, 4 | — | — | — | — | 8, 7, 6, 4 | — | — |
| 2 (new time sequence of the secondary serving cell) | — | — | 7, 6 | 5, 4 | — | — | — | 7, 6 | 5, 4 | — |

In this embodiment, if other TDD CA combinations meet the condition "the uplink subframes of the primary serving cell are not included in the uplink subframes of the secondary serving cell", if the uplink-downlink configuration 5 is not considered, CA of a maximum of five serving cells may be supported; in addition, HARQ-ACK performance and a feedback delay of the secondary serving cell are both optimized.

Herein only a scenario corresponding to the full-duplex UE is described. A scenario corresponding to the half-duplex UE is similar to that in the foregoing embodiment, and is not described again herein.

In addition, because reporting of a duplex capability exists in a current system, signaling for indicating that the UE is full-duplex UE or half-duplex UE in the present disclosure may be the same as signaling for reporting the duplex capability in the current system, or may be independent of signaling for reporting the half-duplex capability in the current system.

On a basis of the foregoing embodiment, before S101, the method may further include: receiving capability information reported by the UE, where the capability information is used to indicate whether the UE supports the HARQ time sequence relationship; and determining, according to the capability information, that the UE supports the HARQ time sequence relationship.

Specifically, an existing HARQ time sequence relationship in TDD CA exists in the current system, temporarily referred to as an original HARQ time sequence relationship; the foregoing time sequence relationship is introduced for the new capability information. In addition, considering that the current system further supports TDD-FDD CA, reporting of the capability information may be bound with a capability of the foregoing TDD-FDD CA, or same signaling is used for reporting, that is, once the UE reports the capability of supporting TDD-FDD CA, the UE also has a capability of supporting the foregoing HARQ time sequence relationship. Optionally, the capability reporting may also be independent of reporting of the TDD-FDD CA capability in the current system.

In the foregoing embodiment, the uplink-downlink configuration of the primary serving cell meets at least one of the following conditions:

Condition 1: When the uplink-downlink configuration of the primary serving cell is the uplink-downlink configuration 0, at least one is subtracted from the subframes of the secondary serving cell corresponding to the HARQ-ACKs of the subframes of the secondary serving cell that are fed back in at least one of the subframe 2, the subframe 3, the subframe 4, the subframe 7, the subframe 8, or the subframe 9 of the primary serving cell.

Condition 2: When the uplink-downlink configuration of the primary serving cell is the uplink-downlink configuration 1, at least one is subtracted from the subframes of the secondary serving cell corresponding to the HARQ-ACKs of the subframes of the secondary serving cell that are fed back in at least one of the subframe 2, the subframe 3, the subframe 7, or the subframe 8 of the primary serving cell.

Condition 3: When the uplink-downlink configuration of the primary serving cell is the uplink-downlink configuration 2, at least one is subtracted from the subframes of the secondary serving cell corresponding to the HARQ-ACKs of the subframes of the secondary serving cell that are fed back in at least one of the subframe 2 or the subframe 7 of the primary serving cell.

Condition 4: When the uplink-downlink configuration of the primary serving cell is the uplink-downlink configuration 6, at least one is subtracted from the subframes of the secondary serving cell corresponding to the HARQ-ACKs of the subframes of the secondary serving cell that are fed back in at least one of the subframe 2, the subframe 3, the subframe 4, the subframe 7, or the subframe 8 of the primary serving cell.

Optionally, a TDD uplink-downlink configuration of the secondary serving cell is the uplink-downlink configuration 5. When the uplink-downlink configuration of the secondary serving cell is 5, the uplink-downlink configuration of the primary serving cell meets at least one of the foregoing conditions. In addition, in this case, effects of this embodiment of the present disclosure still exist. Multiple carriers can be configured in some TDD uplink-downlink configurations. For example, when a configuration of a secondary serving cell is the uplink-downlink configuration 5, the mode of the PUCCH format 3 may support CA of more than two secondary serving cells in the uplink-downlink configuration 5, and HARQ-ACKs that need to be fed back can be dispersed in multiple different uplink subframes for feedback according to the foregoing HARQ time sequence relationship in the carrier aggregation. Therefore, a feedback delay is shortened, and feedback performance is improved.

FIG. 5 is a schematic flowchart of Embodiment 2 of a method for transmitting acknowledgement information according to the present disclosure. This embodiment of the present disclosure provides a method for transmitting acknowledgement information. The method is applied to a TDD system, and may be performed by an apparatus for transmitting acknowledgement information, where the apparatus may be integrated in a device, for example, user equipment. As shown in FIG. 5, the method includes:

S501. Receive a PDSCH in a secondary serving cell, where the secondary serving cell is a secondary serving cell in N TDD secondary serving cells configured by a base station for UE, and N is a natural number that is greater than or equal to 1.

S502. Determine an HARQ time sequence relationship corresponding to the secondary serving cell, where the HARQ time sequence relationship is an HARQ time sequence relationship between the PDSCH and an HARQ-ACK.

S503. Transmit, in a primary serving cell according to the HARQ time sequence relationship, the HARQ-ACK corresponding to the PDSCH, where the primary serving cell is a TDD primary serving cell configured by the base station for the UE.

The method of this embodiment of the present disclosure corresponds to the foregoing method embodiment. In the foregoing method embodiment, a PDSCH is transmitted in a secondary serving cell, and an HARQ-ACK corresponding to the PDSCH is received in a primary serving cell according to the HARQ time sequence relationship. In this embodiment, a PDSCH is received in a secondary serving cell, and an HARQ-ACK corresponding to the PDSCH is transmitted in a primary serving cell according to the HARQ time sequence relationship. Implementation principles and technical effects thereof are similar. Therefore, only a brief description is provided herein, and details are not described again herein.

On the foregoing basis, the HARQ time sequence relationship includes: an uplink-downlink configuration of the primary serving cell is any one of an uplink-downlink configuration 0, an uplink-downlink configuration 1, an uplink-downlink configuration 2, or an uplink-downlink configuration 6. Specifically, when the configurations of the primary serving cell are the foregoing different uplink-downlink configurations, subframes of the secondary serving cell corresponding to the HARQ-ACKs that can be fed back in the primary serving cell are different. Detailed descriptions are provided hereinafter.

When the uplink-downlink configuration of the primary serving cell is the uplink-downlink configuration 0, uplink subframes of the primary serving cell include a subframe 2, a subframe 3, a subframe 4, a subframe 7, a subframe 8, and a subframe 9, where an HARQ-ACK of a subframe of the secondary serving cell corresponding to a subframe that is forward offset by five subframes and/or forward offset by six subframes from the corresponding subframe 2 is fed back in the subframe 2 of the primary serving cell, an HARQ-ACK of a subframe of the secondary serving cell corresponding to a subframe that is forward offset by four subframes and/or forward offset by five subframes from the corresponding subframe 3 is fed back in the subframe 3 of the primary serving cell, an HARQ-ACK of a subframe of the secondary serving cell corresponding to a subframe that is forward offset by four subframes from the corresponding subframe 4 is fed back in the subframe 4 of the primary serving cell, an HARQ-ACK of a subframe of the secondary serving cell corresponding to a subframe that is forward offset by six subframes and/or forward offset by five subframes from the corresponding subframe 7 is fed back in the subframe 7 of the primary serving cell, an HARQ-ACK of a subframe of the secondary serving cell corresponding to a subframe that is forward offset by five subframes and/or forward offset by four subframes from the corresponding subframe 8 is fed back in the subframe 8 of the primary serving cell, and an HARQ-ACK of a subframe of the secondary serving cell corresponding to a subframe that is forward offset by four subframes from the corresponding subframe 9 is fed back in the subframe 9 of the primary serving cell.

When the uplink-downlink configuration of the primary serving cell is the uplink-downlink configuration 1, uplink subframes of the primary serving cell include a subframe 2, a subframe 3, a subframe 7, and a subframe 8, where an HARQ-ACK of a subframe of the secondary serving cell corresponding to a subframe that is forward offset by seven subframes and/or forward offset by six subframes from the corresponding subframe 2 is fed back in the subframe 2 of the primary serving cell, an HARQ-ACK of at least one subframe of the secondary serving cell corresponding to subframes that are forward offset by six subframes, forward offset by five subframes, and forward offset by four subframes from the corresponding subframe 3 is fed back in the subframe 3 of the primary serving cell, an HARQ-ACK of a subframe of the secondary serving cell corresponding to a subframe that is forward offset by seven subframes and/or forward offset by six subframes from the corresponding subframe 7 is fed back in the subframe 7 of the primary serving cell, and an HARQ-ACK of at least one subframe of the secondary serving cell corresponding to subframes that are forward offset by six subframes, forward offset by five subframes, and forward offset by four subframes from the corresponding subframe 8 is fed back in the subframe 8 of the primary serving cell.

When the uplink-downlink configuration of the primary serving cell is the uplink-downlink configuration 2, uplink subframes of the primary serving cell include a subframe 2 and a subframe 7, where an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 2 is fed back in the subframe 2 of the primary serving cell, and an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 7 is fed back in the subframe 7 of the primary serving cell.

When the uplink-downlink configuration of the primary serving cell is the uplink-downlink configuration 6, uplink subframes of the primary serving cell include a subframe 2, a subframe 3, a subframe 4, a subframe 7, and a subframe 8, where an HARQ-ACK of a subframe of the secondary serving cell corresponding to a subframe that is forward offset by eight subframes and/or forward offset by seven subframes from the corresponding subframe 2 is fed back in the subframe 2 of the primary serving cell, an HARQ-ACK of a subframe of the secondary serving cell corresponding to a subframe that is forward offset by seven subframes and/or forward offset by six subframes from the corresponding subframe 3 is fed back in the subframe 3 of the primary serving cell, an HARQ-ACK of a subframe of the secondary serving cell corresponding to a subframe that is forward offset by six subframes and/or forward offset by five subframes from the corresponding subframe 4 is fed back in the subframe 4 of the primary serving cell, an HARQ-ACK of a subframe of the secondary serving cell corresponding to a subframe that is forward offset by seven subframes from the corresponding subframe 7 is fed back in the subframe 7 of the primary serving cell, and an HARQ-ACK of at least one subframe of the secondary serving cell corresponding to subframes that are forward offset by seven subframes, forward offset by six subframes, and forward offset by five subframes from the corresponding subframe 8 is fed back in the subframe 8 of the primary serving cell.

It should be noted that, in any embodiment of the present disclosure, the uplink subframes of the primary serving cell include uplink subframes that are not uplink subframes of the secondary serving cell.

In addition, when the uplink-downlink configuration of the primary serving cell is the uplink-downlink configuration 0, a quantity of the subframes of the secondary serving cell corresponding to the HARQ-ACKs of the subframes of the secondary serving cell that can be fed back in the subframe 2, the subframe 3, the subframe 7, or the subframe 8 of the primary serving cell is 2, and a quantity of the subframes of the secondary serving cell corresponding to the HARQ-ACKs of the subframes of the secondary serving cell that can be fed back in the subframe 4 or the subframe 9 of the primary serving cell is 1.

When the uplink-downlink configuration of the primary serving cell is the uplink-downlink configuration 1, a quantity of the subframes of the secondary serving cell corresponding to the HARQ-ACKs of the subframes of the secondary serving cell that can be fed back in the subframe 2 or the subframe 7 of the primary serving cell is 2, and a quantity of the subframes of the secondary serving cell corresponding to the HARQ-ACKs of the subframes of the secondary serving cell that can be fed back in the subframe 3 or the subframe 8 of the primary serving cell is 3.

When the uplink-downlink configuration of the primary serving cell is the uplink-downlink configuration 2, a quantity of the subframes of the secondary serving cell corresponding to the HARQ-ACKs of the subframes of the secondary serving cell that can be fed back in the subframe 2 or the subframe 7 of the primary serving cell is 5.

When the uplink-downlink configuration of the primary serving cell is the uplink-downlink configuration 6, a quantity of the subframes of the secondary serving cell corresponding to the HARQ-ACKs of the subframes of the secondary serving cell that can be fed back in the subframe 2, the subframe 3, or the subframe 4 of the primary serving cell is 2, a quantity of the subframes of the secondary serving cell corresponding to the HARQ-ACKs of the subframes of the secondary serving cell that can be fed back in the subframe 7 of the primary serving cell is 1, and a quantity of the subframes of the secondary serving cell corresponding to the HARQ-ACKs of the subframes of the secondary serving cell that can be fed back in the subframe 8 of the primary serving cell is 3.

For UE in different transmission modes, the following different scenarios are included, but this is not limited.

Scenario 1: The UE is full-duplex UE, and S503 may include: determining an M value according to a subframe in which the HARQ-ACK corresponding to the PDSCH is transmitted, where the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell; determining an HARQ-ACK feedback table in a channel selection mode according to the M value; and transmitting, in the primary serving cell according to the HARQ-ACK feedback table, the HARQ-ACK corresponding to the PDSCH.

Scenario 2: The UE is full-duplex UE, and S503 may include: determining an M value according to a subframe in which the HARQ-ACK corresponding to the PDSCH is transmitted, where the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell; determining an HARQ-ACK codebook size in a mode of a physical uplink control channel format 3 according to the M value; and transmitting, in the primary serving cell according to the HARQ-ACK codebook size, the HARQ-ACK corresponding to the PDSCH.

Scenario 3: The UE is half-duplex UE, and S503 may include: determining an M value according to a subframe in which the HARQ-ACK corresponding to the PDSCH is transmitted, where the M value is a numeric value obtained after a quantity of uplink subframes in the subframes of the secondary serving cell and a quantity of downlink subframes in the subframes of the secondary serving cell are subtracted from the quantity of the subframes of the secondary serving cell corresponding to the HARQ-ACKs of the subframes of the secondary serving cell that can be fed back in the subframe of the primary serving cell, where a subframe at a same time as the downlink subframe is an uplink subframe or a special subframe in the primary serving cell, where a subframe at a same time as the downlink subframe is an uplink subframe or a special subframe in the primary serving cell; determining an HARQ-ACK feedback table in a channel selection mode according to the M value; and transmitting, in the primary serving cell according to the HARQ-ACK feedback table, the HARQ-ACK corresponding to the PDSCH.

Scenario 4: The UE is half-duplex UE, and S503 may include: determining an M value according to a subframe in which the HARQ-ACK corresponding to the PDSCH is transmitted, where the M value is a numeric value obtained after a quantity of uplink subframes in the subframes of the secondary serving cell and a quantity of downlink subframes in the subframes of the secondary serving cell are subtracted from the quantity of the subframes of the secondary serving cell corresponding to the HARQ-ACKs of the subframes of the secondary serving cell that can be fed back in the subframe of the primary serving cell, where a subframe at a same time as the downlink subframe is an uplink subframe or a special subframe in the primary serving cell; determining an HARQ-ACK codebook size in a mode of a physical uplink control channel format 3 according to the M value; and transmitting, in the primary serving cell according to the HARQ-ACK codebook size, the HARQ-ACK corresponding to the PDSCH.

Further, before S501, the method may further include: reporting capability information to the base station, where the capability information is used to indicate whether the UE supports the HARQ time sequence relationship; and determining, according to the capability information, that the UE supports the HARQ time sequence relationship.

The uplink-downlink configuration of the primary serving cell meets at least one of the following conditions: when the uplink-downlink configuration of the primary serving cell is the uplink-downlink configuration 0, at least one is subtracted from the subframes of the secondary serving cell corresponding to the HARQ-ACKs of the subframes of the secondary serving cell that are fed back in at least one of the subframe 2, the subframe 3, the subframe 4, the subframe 7, the subframe 8, or the subframe 9 of the primary serving cell; when the uplink-downlink configuration of the primary serving cell is the uplink-downlink configuration 1, at least one is subtracted from the subframes of the secondary serving cell corresponding to the HARQ-ACKs of the subframes of the secondary serving cell that are fed back in at least one of the subframe 2, the subframe 3, the subframe 7, or the subframe 8 of the primary serving cell; when the uplink-downlink configuration of the primary serving cell is the uplink-downlink configuration 2, at least one is subtracted from the subframes of the secondary serving cell corresponding to the HARQ-ACKs of the subframes of the secondary serving cell that are fed back in at least one of the subframe 2 or the subframe 7 of the primary serving cell; or when the uplink-downlink configuration of the primary serving cell is the uplink-downlink configuration 6, at least one is subtracted from the subframes of the secondary serving cell corresponding to the HARQ-ACKs of the subframes of the secondary serving cell that are fed back in at least one of the subframe 2, the subframe 3, the subframe 4, the subframe 7, or the subframe 8 of the primary serving cell.

In addition, when an uplink-downlink configuration of the secondary serving cell is an uplink-downlink configuration 5, the uplink-downlink configuration of the primary serving cell meets at least one of the following conditions:

when the uplink-downlink configuration of the primary serving cell is the uplink-downlink configuration 0, one is subtracted from the subframes of the secondary serving cell corresponding to the HARQ-ACKs of the subframes of the secondary serving cell that are fed back in at least one of the subframe 2, the subframe 3, the subframe 4, the subframe 7, the subframe 8, or the subframe 9 of the primary serving cell;

when the uplink-downlink configuration of the primary serving cell is the uplink-downlink configuration 1, one is subtracted from the subframes of the secondary serving cell corresponding to the HARQ-ACKs of the subframes of the secondary serving cell that are fed back in at least one of the subframe 2, the subframe 3, the subframe 7, or the subframe 8 of the primary serving cell;

when the uplink-downlink configuration of the primary serving cell is the uplink-downlink configuration 2, one is subtracted from the subframes of the secondary serving cell corresponding to the HARQ-ACKs of the subframes of the secondary serving cell that are fed back in at least one of the subframe 2 or the subframe 7 of the primary serving cell; or when the uplink-downlink configuration of the primary serving cell is the uplink-downlink configuration 6, one is subtracted from the subframes of the secondary serving cell corresponding to the HARQ-ACKs of the subframes of the secondary serving cell that are fed back in at least one of the subframe 2, the subframe 3, the subframe 4, the subframe 7, or the subframe 8 of the primary serving cell.

In this embodiment of the present disclosure, an HARQ time sequence relationship in carrier aggregation is redefined to limit an uplink-downlink configuration of a primary serving cell to any one of the foregoing uplink-downlink configurations, so that multiple carriers can be configured for carrier aggregation that meets the foregoing limitation condition in some TDD uplink-downlink configurations. For example, when a configuration of a secondary serving cell is an uplink-downlink configuration 5, a mode of a PUCCH format 3 may support CA of more than two secondary serving cells in the uplink-downlink configuration 5, and HARQ-ACKs that need to be fed back can be dispersed in multiple different uplink subframes for feedback according to the foregoing HARQ time sequence relationship in the carrier aggregation. Therefore, a feedback delay is shortened, and feedback performance is improved.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A device comprising:
   a receiver;
   a processor configured to determine to transmit, in a secondary serving cell, a physical downlink shared channel (PDSCH) to a user equipment (UE); and
   a transmitter configured to transmit to the UE, in the secondary serving cell, the PDSCH determined by the processor;
   wherein the processor is further configured to determine a hybrid automatic repeat request (HARQ) time sequence relationship corresponding to the secondary serving cell, wherein the HARQ time sequence relationship is an HARQ time sequence relationship between the PDSCH and HARQ acknowledgement (HARQ-ACK) information;
   wherein the receiver is configured to receive, in a primary serving cell according to the HARQ time sequence relationship determined by the processor, the HARQ-ACK corresponding to the PDSCH;
   wherein the primary serving cell is a time division duplex (TDD) primary serving cell configured by a base station for the UE, the secondary serving cell is a secondary serving cell in at least one TDD secondary serving cell configured by the base station for the UE;
   wherein the HARQ time sequence relationship comprises:
   an uplink-downlink configuration of the primary serving cell that is any one of an uplink-downlink configuration 0, an uplink-downlink configuration 1, an uplink-downlink configuration 2, or an uplink-downlink configuration 6; and
   wherein:
   when the uplink-downlink configuration of the primary serving cell is the uplink-downlink configuration 0, then uplink subframes of the primary serving cell comprise a subframe 2, a subframe 3, a subframe 4, a subframe 7, a subframe 8, and a subframe 9, wherein an HARQ-ACK of a subframe of the secondary serving cell corresponding to a subframe that is forward offset by five subframes and/or forward offset by six subframes from the corresponding subframe 2 is fed back in the subframe 2 of the primary serving cell, an HARQ-ACK of a subframe of the secondary serving cell corresponding to a subframe that is forward offset by four subframes and/or forward offset by five subframes from the corresponding subframe 3 is fed back in the subframe 3 of the primary serving cell, an HARQ-ACK of a subframe of the secondary serving cell corresponding to a subframe that is forward offset by four subframes from the corresponding subframe 4 is fed back in the subframe 4 of the primary serving cell, an HARQ-ACK of a subframe of the secondary serving cell corresponding to a subframe that is forward offset by six subframes and/or forward offset by five subframes from the corresponding subframe 7 is fed back in the subframe 7 of the primary serving cell, an HARQ-ACK of a subframe of the secondary serving cell corresponding to a subframe that is forward offset by five subframes and/or forward offset by four subframes from the corresponding subframe 8 is fed back in the subframe 8 of the primary serving cell, and an HARQ-ACK of a subframe of the secondary serving cell corresponding to a subframe that is forward offset by four subframes from the corresponding subframe 9 is fed back in the subframe 9 of the primary serving cell;

when the uplink-downlink configuration of the primary serving cell is the uplink-downlink configuration 1, then uplink subframes of the primary serving cell comprise a subframe 2, a subframe 3, a subframe 7, and a subframe 8, wherein an HARQ-ACK of a subframe of the secondary serving cell corresponding to a subframe that is forward offset by seven subframes and/or forward offset by six subframes from the corresponding subframe 2 is fed back in the subframe 2 of the primary serving cell, an HARQ-ACK of at least one subframe of the secondary serving cell corresponding to subframes that are forward offset by six subframes, forward offset by five subframes, and forward offset by four subframes from the corresponding subframe 3 is fed back in the subframe 3 of the primary serving cell, an HARQ-ACK of a subframe of the secondary serving cell corresponding to a subframe that is forward offset by seven subframes and/or forward offset by six subframes from the corresponding subframe 7 is fed back in the subframe 7 of the primary serving cell, and an HARQ-ACK of at least one subframe of the secondary serving cell corresponding to subframes that are forward offset by six subframes, forward offset by five subframes, and forward offset by four subframes from the corresponding subframe 8 is fed back in the subframe 8 of the primary serving cell;

when the uplink-downlink configuration of the primary serving cell is the uplink-downlink configuration 2, then uplink subframes of the primary serving cell comprise a subframe 2 and a subframe 7, wherein an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 2 is fed back in the subframe 2 of the primary serving cell, and an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 7 is fed back in the subframe 7 of the primary serving cell; or when the uplink-downlink configuration of the primary serving cell is the uplink-downlink configuration 6, then uplink subframes of the primary serving cell comprise a subframe 2, a subframe 3, a subframe 4, a subframe 7, and a subframe 8, wherein an HARQ-ACK of a subframe of the secondary serving cell corresponding to a subframe that is forward offset by eight subframes and/or forward offset by seven subframes from the corresponding subframe 2 is fed back in the subframe 2 of the primary serving cell, an HARQ-ACK of a subframe of the secondary serving cell corresponding to a subframe that is forward offset by seven subframes and/or forward offset by six subframes from the corresponding subframe 3 is fed back in the subframe 3 of the primary serving cell, an HARQ-ACK of a subframe of the secondary serving cell corresponding to a subframe that is forward offset by six subframes and/or forward offset by five subframes from the corresponding subframe 4 is fed back in the subframe 4 of the primary serving cell, an HARQ-ACK of a subframe of the secondary serving cell corresponding to a subframe that is forward offset by seven subframes from the corresponding subframe 7 is fed back in the subframe 7 of the primary serving cell, and an HARQ-ACK of at least one subframe of the secondary serving cell corresponding to subframes that are forward offset by seven subframes, forward offset by six subframes, and forward offset by five subframes from the corresponding subframe 8 is fed back in the subframe 8 of the primary serving cell.

2. The device according to claim 1, wherein when the uplink-downlink configuration of the primary serving cell is the uplink-downlink configuration 0, then a quantity of the subframes of the secondary serving cell corresponding to the HARQ-ACKs of the subframes of the secondary serving cell that can be fed back in the subframe 2, the subframe 3, the subframe 7, or the subframe 8 of the primary serving cell is 2, and a quantity of the subframes of the secondary serving cell corresponding to the HARQ-ACKs of the subframes of the secondary serving cell that can be fed back in the subframe 4 or the subframe 9 of the primary serving cell is 1;

when the uplink-downlink configuration of the primary serving cell is the uplink-downlink configuration 1, then a quantity of the subframes of the secondary serving cell corresponding to the HARQ-ACKs of the subframes of the secondary serving cell that can be fed back in the subframe 2 or the subframe 7 of the primary serving cell is 2, and a quantity of the subframes of the secondary serving cell corresponding to the HARQ-ACKs of the subframes of the secondary serving cell that can be fed back in the subframe 3 or the subframe 8 of the primary serving cell is 3;

when the uplink-downlink configuration of the primary serving cell is the uplink-downlink configuration 2, then a quantity of the subframes of the secondary serving cell corresponding to the HARQ-ACKs of the subframes of the secondary serving cell that can be fed back in the subframe 2 or the subframe 7 of the primary serving cell is 5; or when the uplink-downlink configuration of the primary serving cell is the uplink-downlink configuration 6, then a quantity of the subframes of the secondary serving cell corresponding to the HARQ-ACKs of the subframes of the secondary serving cell that can be fed back in the subframe 2, the subframe 3, or the subframe 4 of the primary serving cell is 2, a quantity of the subframes of the secondary serving cell corresponding to the HARQ-ACKs of the subframes of the secondary serving cell that can be fed back in the subframe 7 of the primary serving cell is 1, and a quantity of the subframes of the secondary serving cell corresponding to the HARQ-ACKs of the subframes of the secondary serving cell that can be fed back in the subframe 8 of the primary serving cell is 3.

3. The device according to claim 2, wherein the UE is a full-duplex UE, and the receiver is configured to:

determine an M value according to a subframe in which the HARQ-ACK corresponding to the PDSCH is received, wherein the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell;

determine an HARQ-ACK codebook size in a mode of a physical uplink control channel format 3 according to the M value; and receive, in the primary serving cell according to the HARQ-ACK codebook size, the HARQ-ACK corresponding to the PDSCH.

4. The device according to claim 2, wherein:
the receiver is further configured to:
before the transmitter transmits, in the secondary serving cell, the PDSCH determined by the processor to the UE, receive capability information reported by the UE, wherein the capability information is used to indicate whether the UE supports the HARQ time sequence relationship; and
the processor is further configured to:
determine, according to the capability information, that the UE supports the HARQ time sequence relationship.

5. A device comprising:
a receiver configured to receive a physical downlink shared channel (PDSCH) in a secondary serving cell;
a processor configured to determine a hybrid automatic repeat request (HARQ) time sequence relationship corresponding to the secondary serving cell, wherein the HARQ time sequence relationship is an HARQ time sequence relationship between the PDSCH received by the receiver and HARQ acknowledgement (HARQ-ACK) information; and
a transmitter configured to transmit, in a primary serving cell according to the HARQ time sequence relationship determined by the processor, the HARQ-ACK corresponding to the PDSCH;
wherein the primary serving cell is a time division duplex (TDD) primary serving cell configured by a base station for a user equipment (UE), the secondary serving cell is a secondary serving cell in at least one TDD secondary serving cell configured by the base station for the UE;
wherein the HARQ time sequence relationship comprises:
an uplink-downlink configuration of the primary serving cell that is any one of an uplink-downlink configuration 0, an uplink-downlink configuration 1, an uplink-downlink configuration 2, or an uplink-downlink configuration 6; and
wherein:
when the uplink-downlink configuration of the primary serving cell is the uplink-downlink configuration 0, then uplink subframes of the primary serving cell comprise a subframe 2, a subframe 3, a subframe 4, a subframe 7, a subframe 8, and a subframe 9, wherein an HARQ-ACK of a subframe of the secondary serving cell corresponding to a subframe that is forward offset by five subframes and/or forward offset by six subframes from the corresponding subframe 2 is fed back in the subframe 2 of the primary serving cell, an HARQ-ACK of a subframe of the secondary serving cell corresponding to a subframe that is forward offset by four subframes and/or forward offset by five subframes from the corresponding subframe 3 is fed back in the subframe 3 of the primary serving cell, an HARQ-ACK of a subframe of the secondary serving cell corresponding to a subframe that is forward offset by four subframes from the corresponding subframe 4 is fed back in the subframe 4 of the primary serving cell, an HARQ-ACK of a subframe of the secondary serving cell corresponding to a subframe that is forward offset by six subframes and/or forward offset by five subframes from the corresponding subframe 7 is fed back in the subframe 7 of the primary serving cell, an HARQ-ACK of a subframe of the secondary serving cell corresponding to a subframe that is forward offset by five subframes and/or forward offset by four subframes from the corresponding subframe 8 is fed back in the subframe 8 of the primary serving cell, and an HARQ-ACK of a subframe of the secondary serving cell corresponding to a subframe that is forward offset by four subframes from the corresponding subframe 9 is fed back in the subframe 9 of the primary serving cell;

when the uplink-downlink configuration of the primary serving cell is the uplink-downlink configuration 1, then uplink subframes of the primary serving cell comprise a subframe 2, a subframe 3, a subframe 7, and a subframe 8, wherein an HARQ-ACK of a subframe of the secondary serving cell corresponding to a subframe that is forward offset by seven subframes and/or forward offset by six subframes from the corresponding subframe 2 is fed back in the subframe 2 of the primary serving cell, an HARQ-ACK of at least one subframe of the secondary serving cell corresponding to subframes that are forward offset by six subframes, forward offset by five subframes, and forward offset by four subframes from the corresponding subframe 3 is fed back in the subframe 3 of the primary serving cell, an HARQ-ACK of a subframe of the secondary serving cell corresponding to a subframe that is forward offset by seven subframes and/or forward offset by six subframes from the corresponding subframe 7 is fed back in the subframe 7 of the primary serving cell, and an HARQ-ACK of at least one subframe of the secondary serving cell corresponding to subframes that are forward offset by six subframes, forward offset by five subframes, and forward offset by four subframes from the corresponding subframe 8 is fed back in the subframe 8 of the primary serving cell;

when the uplink-downlink configuration of the primary serving cell is the uplink-downlink configuration 2, then uplink subframes of the primary serving cell comprise a subframe 2 and a subframe 7, wherein an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 2 is fed back in the subframe 2 of the primary serving cell, and an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 7 is fed back in the subframe 7 of the primary serving cell; or when the uplink-downlink configuration of the primary serving cell is the uplink-downlink configuration 6, then uplink subframes of the primary serving cell comprise a subframe 2, a subframe 3, a subframe 4, a subframe 7, and a subframe 8, wherein an HARQ-ACK of a subframe of the secondary serving cell corresponding to a subframe that is forward offset by eight subframes and/or forward offset by seven subframes from the corresponding subframe 2 is fed back in the subframe 2 of the primary serving cell, an HARQ-ACK of a subframe of the secondary serving cell corresponding to a subframe that is forward offset by seven subframes and/or forward offset by six subframes from the corresponding subframe 3 is fed back in the subframe 3 of the primary serving cell, an HARQ-ACK of a subframe of the secondary serving cell corresponding to a subframe that is forward offset by six subframes and/or forward offset by five subframes from the corresponding subframe 4 is fed back in the subframe 4 of the primary serving cell, an HARQ-ACK of a subframe of the secondary serving cell corresponding to a subframe that is forward offset by seven subframes from the corresponding subframe 7 is fed back in the subframe 7 of the primary serving cell, and an HARQ-ACK of at least one subframe of the secondary serving cell corresponding to subframes that are forward offset by seven subframes, forward offset by six subframes, and forward offset by five subframes from the corresponding subframe 8 is fed back in the subframe 8 of the primary serving cell.

6. The device according to claim 5, wherein
when the uplink-downlink configuration of the primary serving cell is the uplink-downlink configuration 0, then a quantity of the subframes of the secondary serving cell corresponding to the HARQ-ACKs of the subframes of the secondary serving cell that can be fed back in the subframe 2, the subframe 3, the subframe 7, or the subframe 8 of the primary serving cell is 2, and a quantity of the subframes of the secondary serving cell corresponding to the HARQ-ACKs of the subframes of the secondary serving cell that can be fed back in the subframe 4 or the subframe 9 of the primary serving cell is 1;

when the uplink-downlink configuration of the primary serving cell is the uplink-downlink configuration 1, then a quantity of the subframes of the secondary serving cell corresponding to the HARQ-ACKs of the subframes of the secondary serving cell that can be fed back in the subframe 2 or the subframe 7 of the primary serving cell is 2, and a quantity of the subframes of the secondary serving cell corresponding to the HARQ-ACKs of the subframes of the secondary serving cell that can be fed back in the subframe 3 or the subframe 8 of the primary serving cell is 3;

when the uplink-downlink configuration of the primary serving cell is the uplink-downlink configuration 2, then a quantity of the subframes of the secondary serving cell corresponding to the HARQ-ACKs of the subframes of the secondary serving cell that can be fed back in the subframe 2 or the subframe 7 of the primary serving cell is 5; or when the uplink-downlink configuration of the primary serving cell is the uplink-downlink configuration 6, then a quantity of the subframes of the secondary serving cell corresponding to the HARQ-ACKs of the subframes of the secondary serving cell that can be fed back in the subframe 2, the subframe 3, or the subframe 4 of the primary serving cell is 2, a quantity of the subframes of the secondary serving cell corresponding to the HARQ-ACKs of the subframes of the secondary serving cell that can be fed back in the subframe 7 of the primary serving cell is 1, and a quantity of the subframes of the secondary serving cell corresponding to the HARQ-ACKs of the subframes of the secondary serving cell that can be fed back in the subframe 8 of the primary serving cell is 3.

7. The device according to claim 6, wherein the UE is a full-duplex UE, and the transmitter is configured to:
determine an M value according to a subframe in which the HARQ-ACK corresponding to the PDSCH is transmitted, wherein the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell;
determine an HARQ-ACK codebook size in a mode of a physical uplink control channel format 3 according to the M value; and
transmit, in the primary serving cell according to the HARQ-ACK codebook size, the HARQ-ACK corresponding to the PDSCH.

8. The device according to claim 6, wherein:
the transmitter is further configured to:
before the receiver receives the PDSCH in the secondary serving cell, report capability information to the base station, wherein the capability information is used to indicate whether the UE supports the HARQ time sequence relationship; and
the processor is further configured to:
determine, according to the capability information, that the apparatus supports the HARQ time sequence relationship.

9. A method comprising:
determining to transmit, in a secondary serving cell, a physical downlink shared channel (PDSCH) to a user equipment (UE);
transmitting, in the secondary serving cell, the PDSCH to the UE;
determining a hybrid automatic repeat request (HARQ) time sequence relationship corresponding to the secondary serving cell, wherein the HARQ time sequence relationship is an HARQ time sequence relationship between the PDSCH and HARQ acknowledgement (HARQ-ACK) information; and
receiving, in a primary serving cell according to the HARQ time sequence relationship, the HARQ-ACK corresponding to the PDSCH;
wherein the primary serving cell is a time division duplex (TDD) primary serving cell configured by a base station for the UE, the secondary serving cell is a secondary serving cell in at least one TDD secondary serving cell configured by the base station for the UE;
wherein the HARQ time sequence relationship comprises:
an uplink-downlink configuration of the primary serving cell that is any one of an uplink-downlink configuration 0, an uplink-downlink configuration 1, an uplink-downlink configuration 2, or an uplink-downlink configuration 6; and wherein:
when the uplink-downlink configuration of the primary serving cell is the uplink-downlink configuration 0, then uplink subframes of the primary serving cell comprise a subframe 2, a subframe 3, a subframe 4, a subframe 7, a subframe 8, and a subframe 9, wherein an HARQ-ACK of a subframe of the secondary serving cell corresponding to a subframe that is forward offset by five subframes and/or forward offset by six subframes from the corresponding subframe 2 is fed back in the subframe 2 of the primary serving cell, an HARQ-ACK of a subframe of the secondary serving cell corresponding to a subframe that is forward offset by four subframes and/or forward offset by five subframes from the corresponding subframe 3 is fed back in the subframe 3 of the primary serving cell, an HARQ-ACK of a subframe of the secondary serving cell corresponding to a subframe that is forward offset by four subframes from the corresponding subframe 4 is fed back in the subframe 4 of the primary serving cell, an HARQ-ACK of a subframe of the secondary serving cell corresponding to a subframe that is forward offset by six subframes and/or forward offset by five subframes from the corresponding subframe 7 is fed back in the subframe 7 of the primary serving cell, an HARQ-ACK of a subframe of the secondary serving cell corresponding to a subframe that is forward offset by five subframes and/or forward offset by four subframes from the corresponding subframe 8 is fed back in the subframe 8 of the primary serving cell, and an HARQ-ACK of a subframe of the secondary serving cell corresponding to a subframe that is forward offset by four subframes from the corresponding subframe 9 is fed back in the subframe 9 of the primary serving cell;

when the uplink-downlink configuration of the primary serving cell is the uplink-downlink configuration 1, then uplink subframes of the primary serving cell comprise a subframe 2, a subframe 3, a subframe 7, and a subframe 8, wherein an HARQ-ACK of a subframe of the secondary serving cell corresponding to a subframe that is forward offset by seven subframes and/or forward offset by six subframes from the corresponding subframe 2 is fed back in the subframe 2 of the primary serving cell, an HARQ-ACK of at least one subframe of the secondary serving cell corresponding to subframes that are forward offset by six subframes, forward offset by five subframes, and forward offset by four subframes from the corresponding subframe 3 is fed back in the subframe 3 of the primary serving cell, an HARQ-ACK of a subframe of the secondary serving cell corresponding to a subframe that is forward offset by seven subframes and/or forward offset by six subframes from the corresponding subframe 7 is fed back in the subframe 7 of the primary serving cell, and an HARQ-ACK of at least one subframe of the secondary serving cell corresponding to subframes that are forward offset by six subframes, forward offset by five subframes, and forward offset by four subframes from the corresponding subframe 8 is fed back in the subframe 8 of the primary serving cell;

when the uplink-downlink configuration of the primary serving cell is the uplink-downlink configuration 2, then uplink subframes of the primary serving cell comprise a subframe 2 and a subframe 7, wherein an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 2 is fed back in the subframe 2 of the primary serving cell, and an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 7 is fed back in the subframe 7 of the primary serving cell; or when the uplink-downlink configuration of the primary serving cell is the uplink-downlink configuration 6, then uplink subframes of the primary serving cell comprise a subframe 2, a subframe 3, a subframe 4, a subframe 7, and a subframe 8, wherein an HARQ-ACK of a subframe of the secondary serving cell corresponding to a subframe that is forward offset by eight subframes and/or forward offset by seven subframes from the corresponding subframe 2 is fed back in the subframe 2 of the primary serving cell, an HARQ-ACK of a subframe of the secondary serving cell corresponding to a subframe that is forward offset by seven subframes and/or forward offset by six subframes from the corresponding subframe 3 is fed back in the subframe 3 of the primary serving cell, an HARQ-ACK of a subframe of the secondary serving cell corresponding to a subframe that is forward offset by six subframes and/or forward offset by five subframes from the corresponding subframe 4 is fed back in the subframe 4 of the primary serving cell, an HARQ-ACK of a subframe of the secondary serving cell corresponding to a subframe that is forward offset by seven subframes from the corresponding subframe 7 is fed back in the subframe 7 of the primary serving cell, and an HARQ-ACK of at least one subframe of the secondary serving cell corresponding to subframes that are forward offset by seven subframes, forward offset by six subframes, and forward offset by five subframes from the corresponding subframe 8 is fed back in the subframe 8 of the primary serving cell.

10. The method according to claim 9, wherein
when the uplink-downlink configuration of the primary serving cell is the uplink-downlink configuration 0, then a quantity of the subframes of the secondary serving cell corresponding to the HARQ-ACKs of the subframes of the secondary serving cell that can be fed back in the subframe 2, the subframe 3, the subframe 7, or the subframe 8 of the primary serving cell is 2, and a quantity of the subframes of the secondary serving cell corresponding to the HARQ-ACKs of the subframes of the secondary serving cell that can be fed back in the subframe 4 or the subframe 9 of the primary serving cell is 1;

when the uplink-downlink configuration of the primary serving cell is the uplink-downlink configuration 1, then a quantity of the subframes of the secondary serving cell corresponding to the HARQ-ACKs of the subframes of the secondary serving cell that can be fed back in the subframe 2 or the subframe 7 of the primary serving cell is 2, and a quantity of the subframes of the secondary serving cell corresponding to the HARQ- ACKs of the subframes of the secondary serving cell that can be fed back in the subframe 3 or the subframe 8 of the primary serving cell is 3;

when the uplink-downlink configuration of the primary serving cell is the uplink-downlink configuration 2, then a quantity of the subframes of the secondary serving cell corresponding to the HARQ-ACKs of the subframes of the secondary serving cell that can be fed back in the subframe 2 or the subframe 7 of the primary serving cell is 5; or when the uplink-downlink configuration of the primary serving cell is the uplink-downlink configuration 6, then a quantity of the subframes of the secondary serving cell corresponding to the HARQ-ACKs of the subframes of the secondary serving cell that can be fed back in the subframe 2, the subframe 3, or the subframe 4 of the primary serving cell is 2, a quantity of the subframes of the secondary serving cell corresponding to the HARQ-ACKs of the subframes of the secondary serving cell that can be fed back in the subframe 7 of the primary serving cell is 1, and a quantity of the subframes of the secondary serving cell corresponding to the HARQ-ACKs of the subframes of the secondary serving cell that can be fed back in the subframe 8 of the primary serving cell is 3.

11. The method according to claim 10, wherein the UE is a full-duplex UE, and the receiving, in the primary serving cell according to the HARQ time sequence relationship, the HARQ-ACK corresponding to the PDSCH, comprises:

determining an M value according to a subframe in which the HARQ-ACK corresponding to the PDSCH is received, wherein the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell;

determining an HARQ-ACK codebook size in a mode of a physical uplink control channel format 3 according to the M value; and receiving, in the primary serving cell according to the HARQ-ACK codebook size, the HARQ-ACK corresponding to the PDSCH.

12. The method according to claim 10, wherein before the transmitting, in the secondary serving cell, the PDSCH to the UE, the method further comprises:

receiving capability information reported by the UE, wherein the capability information is used to indicate whether the UE supports the HARQ time sequence relationship; and determining, according to the capability information, that the UE supports the HARQ time sequence relationship.

13. A method comprising:

receiving a physical downlink shared channel (PDSCH) in a secondary serving cell;

determining a hybrid automatic repeat request (HARQ) time sequence relationship corresponding to the secondary serving cell, wherein the HARQ time sequence relationship is an HARQ time sequence relationship between the PDSCH and HARQ acknowledgement (HARQ-ACK) information; and transmitting, in a primary serving cell according to the HARQ time sequence relationship, the HARQ-ACK corresponding to the PDSCH;

wherein the primary serving cell is a time division duplex (TDD) primary serving cell configured by a base station for a user equipment (UE), the secondary serving cell is a secondary serving cell in at least one TDD secondary serving cell configured by the base station for the UE;

wherein the HARQ time sequence relationship comprises:

an uplink-downlink configuration of the primary serving cell that is any one of an uplink-downlink configuration 0, then an uplink-downlink configuration 1, an uplink-downlink configuration 2, or an uplink-downlink configuration 6; and wherein:

when the uplink-downlink configuration of the primary serving cell is the uplink-downlink configuration 0, then uplink subframes of the primary serving cell comprise a subframe 2, a subframe 3, a subframe 4, a subframe 7, a subframe 8, and a subframe 9, wherein an HARQ-ACK of a subframe of the secondary serving cell corresponding to a subframe that is forward offset by five subframes and/or forward offset by six subframes from the corresponding subframe 2 is fed back in the subframe 2 of the primary serving cell, an HARQ-ACK of a subframe of the secondary serving cell corresponding to a subframe that is forward offset by four subframes and/or forward offset by five subframes from the corresponding subframe 3 is fed back in the subframe 3 of the primary serving cell, an HARQ-ACK of a subframe of the secondary serving cell corresponding to a subframe that is forward offset by four subframes from the corresponding subframe 4 is fed back in the subframe 4 of the primary serving cell, an HARQ-ACK of a subframe of the secondary serving cell corresponding to a subframe that is forward offset by six subframes and/or forward offset by five subframes from the corresponding subframe 7 is fed back in the subframe 7 of the primary serving cell, an HARQ-ACK of a subframe of the secondary serving cell corresponding to a subframe that is forward offset by five subframes and/or forward offset by four subframes from the corresponding subframe 8 is fed back in the subframe 8 of the primary serving cell, and an HARQ-ACK of a subframe of the secondary serving cell corresponding to a subframe that is forward offset by four subframes from the corresponding subframe 9 is fed back in the subframe 9 of the primary serving cell;

when the uplink-downlink configuration of the primary serving cell is the uplink-downlink configuration 1, then uplink subframes of the primary serving cell comprise a subframe 2, a subframe 3, a subframe 7, and a subframe 8, wherein an HARQ-ACK of a subframe of the secondary serving cell corresponding to a subframe that is forward offset by seven subframes and/or forward offset by six subframes from the corresponding subframe 2 is fed back in the subframe 2 of the primary serving cell, an HARQ-ACK of at least one subframe of the secondary serving cell corresponding to subframes that are forward offset by six subframes, forward offset by five subframes, and forward offset by four subframes from the corresponding subframe 3 is fed back in the subframe 3 of the primary serving cell, an HARQ-ACK of a subframe of the secondary serving cell corresponding to a subframe that is forward offset by seven subframes and/or forward offset by six subframes from the corresponding subframe 7 is fed back in the subframe 7 of the primary serving cell, and an HARQ-ACK of at least one subframe of the secondary serving cell corresponding to subframes that are forward offset by six subframes, forward offset by five subframes, and forward offset by four subframes from the corresponding subframe 8 is fed back in the subframe 8 of the primary serving cell;

when the uplink-downlink configuration of the primary serving cell is the uplink-downlink configuration 2, then uplink subframes of the primary serving cell comprise a subframe 2 and a subframe 7, wherein an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 2 is fed back in the subframe 2 of the primary serving cell, and an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 7 is fed back in the subframe 7 of the primary serving cell; or when the uplink-downlink configuration of the primary serving cell is the uplink-downlink configuration 6, then uplink subframes of the primary serving cell comprise a subframe 2, a subframe 3, a subframe 4, a subframe 7, and a subframe 8, wherein an HARQ-ACK of a subframe of the secondary serving cell corresponding to a subframe that is forward offset by eight subframes and/or forward offset by seven subframes from the corresponding subframe 2 is fed back in the subframe 2 of the primary serving cell, an HARQ-ACK of a subframe of the secondary serving cell corresponding to a subframe that is forward offset by seven subframes and/or forward offset by six subframes from the corresponding subframe 3 is fed back in the subframe 3 of the primary serving cell, an HARQ-ACK of a subframe of the secondary serving cell corresponding to a subframe that is forward offset by six subframes and/or forward offset by five subframes from the corresponding subframe 4 is fed back in the subframe 4 of the primary serving cell, an HARQ-ACK of a subframe of the secondary serving cell corresponding to a subframe that is forward offset by seven subframes from the corresponding subframe 7 is fed back in the subframe 7 of the primary serving cell, and an HARQ-ACK of at least one subframe of the secondary serving cell corresponding to subframes that are forward offset by seven subframes, forward offset by six subframes, and forward offset by five subframes from the corresponding subframe 8 is fed back in the subframe 8 of the primary serving cell.

14. The method according to claim 13, wherein when the uplink-downlink configuration of the primary serving cell is the uplink-downlink configuration 0, then a quantity of the subframes of the secondary serving cell corresponding to the HARQ-ACKs of the subframes of the secondary serving cell that can be fed back in the subframe 2, the subframe 3, the subframe 7, or the subframe 8 of the primary serving cell is 2, and a quantity of the subframes of the secondary serving cell corresponding to the HARQ-ACKs of the subframes of the secondary serving cell that can be fed back in the subframe 4 or the subframe 9 of the primary serving cell is 1;

when the uplink-downlink configuration of the primary serving cell is the uplink-downlink configuration 1, then a quantity of the subframes of the secondary serving cell corresponding to the HARQ-ACKs of the subframes of the secondary serving cell that can be fed back in the subframe 2 or the subframe 7 of the primary serving cell is 2, and a quantity of the subframes of the secondary serving cell corresponding to the HARQ-ACKs of the subframes of the secondary serving cell that can be fed back in the subframe 3 or the subframe 8 of the primary serving cell is 3;

when the uplink-downlink configuration of the primary serving cell is the uplink-downlink configuration 2, then a quantity of the subframes of the secondary serving cell corresponding to the HARQ-ACKs of the subframes of the secondary serving cell that can be fed back in the subframe 2 or the subframe 7 of the primary serving cell is 5; or when the uplink-downlink configuration of the primary serving cell is the uplink-downlink configuration 6, then a quantity of the subframes of the secondary serving cell corresponding to the HARQ-ACKs of the subframes of the secondary serving cell that can be fed back in the subframe 2, the subframe 3, or the subframe 4 of the primary serving cell is 2, a quantity of the subframes of the secondary serving cell corresponding to the HARQ-ACKs of the subframes of the secondary serving cell that can be fed back in the subframe 7 of the primary serving cell is 1, and a quantity of the subframes of the secondary serving cell corresponding to the HARQ-ACKs of the subframes of the secondary serving cell that can be fed back in the subframe 8 of the primary serving cell is 3.

15. The method according to claim 14, wherein the UE is a full-duplex UE, and the transmitting, in the primary serving cell according to the HARQ time sequence relationship, the HARQ-ACK corresponding to the PDSCH, comprises:

determining an M value according to a subframe in which the HARQ-ACK corresponding to the PDSCH is transmitted, wherein the M value is a numeric value obtained after a quantity of uplink subframes in the subframes of the secondary serving cell is subtracted from the quantity of the subframes of the secondary serving cell corresponding to the HARQ-ACKs of the subframes of the secondary serving cell that can be fed back in the subframe of the primary serving cell;

determining an HARQ-ACK codebook size in a mode of a physical uplink control channel format 3 according to the M value; and transmitting, in the primary serving cell according to the HARQ-ACK codebook size, the HARQ-ACK corresponding to the PDSCH.

16. The method according to claim 14, wherein before the receiving a PDSCH in the secondary serving cell, the method further comprises:

reporting capability information to the base station, wherein the capability information is used to indicate whether the UE supports the HARQ time sequence relationship; and determining, according to the capability information, that the UE supports the HARQ time sequence relationship.

17. A non-transitory computer-readable storage medium comprising instructions that, when executed by a processor in a user equipment (UE), cause the processor to:
- receive a physical downlink shared channel (PDSCH) in a secondary serving cell;
- determine a hybrid automatic repeat request (HARQ) time sequence relationship corresponding to the secondary serving cell, wherein the HARQ time sequence relationship is an HARQ time sequence relationship between the PDSCH and HARQ acknowledgement (HARQ-ACK) information; and
- transmit, in a primary serving cell according to the HARQ time sequence relationship, the HARQ-ACK corresponding to the PDSCH;

wherein the primary serving cell is a time division duplex (TDD) primary serving cell configured by a base station for the UE, the secondary serving cell is a secondary serving cell in at least one TDD secondary serving cell configured by the base station for the UE;

wherein the HARQ time sequence relationship comprises:
- an uplink-downlink configuration of the primary serving cell that is any one of an uplink-downlink configuration 0, then an uplink-downlink configuration 1, an uplink-downlink configuration 2, or an uplink-downlink configuration 6; and wherein:
- when the uplink-downlink configuration of the primary serving cell is the uplink-downlink configuration 0, then uplink subframes of the primary serving cell comprise a subframe 2, a subframe 3, a subframe 4, a subframe 7, a subframe 8, and a subframe 9, wherein an HARQ-ACK of a subframe of the secondary serving cell corresponding to a subframe that is forward offset by five subframes and/or forward offset by six subframes from the corresponding subframe 2 is fed back in the subframe 2 of the primary serving cell, an HARQ-ACK of a subframe of the secondary serving cell corresponding to a subframe that is forward offset by four subframes and/or forward offset by five subframes from the corresponding subframe 3 is fed back in the subframe 3 of the primary serving cell, an HARQ-ACK of a subframe of the secondary serving cell corresponding to a subframe that is forward offset by four subframes from the corresponding subframe 4 is fed back in the subframe 4 of the primary serving cell, an HARQ-ACK of a subframe of the secondary serving cell corresponding to a subframe that is forward offset by six subframes and/or forward offset by five subframes from the corresponding subframe 7 is fed back in the subframe 7 of the primary serving cell, an HARQ-ACK of a subframe of the secondary serving cell corresponding to a subframe that is forward offset by five subframes and/or forward offset by four subframes from the corresponding subframe 8 is fed back in the subframe 8 of the primary serving cell, and an HARQ-ACK of a subframe of the secondary serving cell corresponding to a subframe that is forward offset by four subframes from the corresponding subframe 9 is fed back in the subframe 9 of the primary serving cell;

- when the uplink-downlink configuration of the primary serving cell is the uplink-downlink configuration 1, then uplink subframes of the primary serving cell comprise a subframe 2, a subframe 3, a subframe 7, and a subframe 8, wherein an HARQ-ACK of a subframe of the secondary serving cell corresponding to a subframe that is forward offset by seven subframes and/or forward offset by six subframes from the corresponding subframe 2 is fed back in the subframe 2 of the primary serving cell, an HARQ-ACK of at least one subframe of the secondary serving cell corresponding to subframes that are forward offset by six subframes, forward offset by five subframes, and forward offset by four subframes from the corresponding subframe 3 is fed back in the subframe 3 of the primary serving cell, an HARQ-ACK of a subframe of the secondary serving cell corresponding to a subframe that is forward offset by seven subframes and/or forward offset by six subframes from the corresponding subframe 7 is fed back in the subframe 7 of the primary serving cell, and an HARQ-ACK of at least one subframe of the secondary serving cell corresponding to subframes that are forward offset by six subframes, forward offset by five subframes, and forward offset by four subframes from the corresponding subframe 8 is fed back in the subframe 8 of the primary serving cell;

- when the uplink-downlink configuration of the primary serving cell is the uplink-downlink configuration 2, then uplink subframes of the primary serving cell comprise a subframe 2 and a subframe 7, wherein an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 2 is fed back in the subframe 2 of the primary serving cell, and an HARQ-ACK of at least one subframe of the secondary serving cell corresponding to subframes that are forward offset by eight subframes, forward offset by seven subframes, forward offset by six subframes, forward offset by five subframes, and forward offset by four subframes from the corresponding subframe 7 is fed back in the subframe 7 of the primary serving cell; or

- when the uplink-downlink configuration of the primary serving cell is the uplink-downlink configuration 6, then uplink subframes of the primary serving cell comprise a subframe 2, a subframe 3, a subframe 4, a subframe 7, and a subframe 8, wherein an HARQ-ACK of a subframe of the secondary serving cell corresponding to a subframe that is forward offset by eight subframes and/or forward offset by seven subframes from the corresponding subframe 2 is fed back in the subframe 2 of the primary serving cell, an HARQ-ACK of a subframe of the secondary serving cell corresponding to a subframe that is forward offset by seven subframes and/or forward offset by six subframes from the corresponding subframe 3 is fed back in the subframe 3 of the primary serving cell, an HARQ-ACK of a subframe of the secondary serving cell corresponding to a subframe that is forward offset by six subframes and/or forward offset by five subframes from the corresponding subframe 4 is fed back in the subframe 4 of the primary serving cell, an HARQ-ACK of a subframe of the secondary serving cell corresponding to a subframe that is forward offset by seven subframes from the corresponding subframe 7 is fed back in the subframe 7 of the primary serving cell, and an HARQ-ACK of at least one subframe of the secondary serving cell corresponding to subframes that are forward offset by seven subframes, forward offset by six subframes, and forward offset by five subframes from the corresponding subframe 8 is fed back in the subframe 8 of the primary serving cell.

\* \* \* \* \*